US012693439B2

(12) United States Patent
Bindley et al.

(10) Patent No.: US 12,693,439 B2
(45) Date of Patent: Jul. 28, 2026

(54) DIRECT ATTACH RADIATION DETECTOR STRUCTURES INCLUDING PIXELATED SENSORS AND READ-OUT CIRCUITRY HAVING VARYING PITCH

(71) Applicant: REDLEN TECHNOLOGIES, INC., Saanichton (CA)

(72) Inventors: Glenn Bindley, Victoria (CA); Krzysztof Iniewski, Port Moody (CA); Michael Ayukawa, Victoria (CA)

(73) Assignee: REDLEN TECHNOLOGIES, INC., Saanichton (CA)

( * ) Notice: Subject to any disclaimer, the term of this patent is extended or adjusted under 35 U.S.C. 154(b) by 163 days.

(21) Appl. No.: 18/612,288

(22) Filed: Mar. 21, 2024

(65) Prior Publication Data

US 2024/0377544 A1 Nov. 14, 2024

Related U.S. Application Data

(60) Provisional application No. 63/500,992, filed on May 9, 2023.

(51) Int. Cl.
*G01T 1/29* (2006.01)
*G01T 1/24* (2006.01)

(52) U.S. Cl.
CPC ............ *G01T 1/2928* (2013.01); *G01T 1/241* (2013.01); *G01T 1/247* (2013.01)

(58) Field of Classification Search
CPC ........ G01T 1/2928; G01T 1/241; G01T 1/247
See application file for complete search history.

(56) References Cited

U.S. PATENT DOCUMENTS 6,470,065 B1 10/2002 Lauther
6,990,176 B2 1/2006 Sherman et al.
(Continued)

FOREIGN PATENT DOCUMENTS

JP 4934826 B2 5/2012
WO WO2013/050229 A1 4/2013

OTHER PUBLICATIONS

Iniewski, K. et al., "Direct Attach Radiation Detector Structures Having Reduced Cross-Talk," U.S. Appl. No. 18/612,350, filed Mar. 21, 2024.

(Continued)

*Primary Examiner* — Hugh Maupin
(74) *Attorney, Agent, or Firm* — THE MARBURY LAW GROUP PLLC

(57) ABSTRACT

Direct attach radiation detector structures include an application specific integrated circuit (ASIC) including an array of unit cells including signal processing channel circuitry and at least one radiation sensor including an array of pixel detectors located over a front surface of the ASIC. In various embodiments, an ASIC having a fixed layout of unit cells may accommodate different radiation sensors having varying layouts of pixel detectors. In some embodiments, a redistribution layer on the front surface of the ASIC may route detection signals from pixel detectors to the corresponding unit cells. Alternatively, or in addition, a subset of the unit cells of the ASIC may be active unit cells that are electrically coupled to a pixel detector. The remaining unit cells may be inactive unit cells that may be powered down.

12 Claims, 12 Drawing Sheets

(56) References Cited

U.S. PATENT DOCUMENTS

| | | | |
|---|---|---|---|
| 7,327,866 | B2 | 2/2008 | Bae et al. |
| 8,120,683 | B1 | 2/2012 | Tumer et al. |
| 9,202,961 | B2 | 12/2015 | Chen et al. |
| 10,393,891 | B2 | 8/2019 | Iniewski et al. |
| 10,396,109 | B2 | 8/2019 | Iniewski et al. |
| 11,067,707 | B2 | 7/2021 | Crestani et al. |
| 2003/0058998 | A1 | 3/2003 | Aufrichtig et al. |
| 2004/0217294 | A1* | 11/2004 | Zur .......................... G01T 1/247 250/370.09 |
| 2008/0273424 | A1* | 11/2008 | Wodnicki ............... H10D 89/10 257/E27.107 |
| 2011/0071397 | A1* | 3/2011 | Wodnicki .............. B06B 1/0629 228/179.1 |
| 2017/0322319 | A1 | 11/2017 | Iniewski et al. |
| 2019/0339402 | A1 | 11/2019 | Crestani et al. |
| 2021/0285897 | A1 | 9/2021 | Read et al. |
| 2022/0045118 | A1 | 2/2022 | Kumar et al. |
| 2023/0243985 | A1 | 8/2023 | Bindley et al. |
| 2023/0333267 | A1* | 10/2023 | Taboada .................. G01T 1/247 |
| 2024/0350833 | A1* | 10/2024 | Prekas ................. A61B 6/4241 |

OTHER PUBLICATIONS

European Patent Office Communication, Extended European Search Report for EP Application No. 22157726.5, mailed Jul. 25, 2022, 23 pages.

Goderer, E. et al., "A Four-Side-Buttable Photon Counting ASIC for Computed Tomography," 5th Workshop on Medical Applications of Spectroscopic X-Ray Detectors, SIEMENS Healthineers, (May 2019), 30 pages.

https://harvestimaging.com/blog/?p=1599, (Sep. 8, 2016), 17 pages.

Jerram, P. et al., "Teledyne's High Performance Infrared Detectors for Space Missions," Proceedings vol. 11180, International Conference on Space Optics—ICSO 2018; 111803D (2019) https://doi.org/10.1117/12.2536040.

Rajendran, K. et al., "Full field-of-view, high-resolution, photon-counting detector CT: technical assessment and initial patient experience," Phys Med Biol, vol. 66, No. 20, 10.1088/1361-6560/ac155e, Oct. 27, 2021; doi: 10.1088/1361-6560/ac155e.

Ayukawa, M. et al., "Radiation Detector Module with Local Processing Unit," U.S. Appl. No. 18/462,859, filed Sep. 7, 2023.

Ayukawa, M. et al., "Radiation Detector Module Including Application Specific Integrated Circuit with Through-Substrate Vias," U.S. Appl. No. 18/468,891, filed Sep. 18, 2023.

Ayukawa, M. et al., "Direct Attach Radiation Detector Structures Including a Carrier Board and Methods of Fabrication Thereof," U.S. Appl. No. 18/602,887, filed Mar. 12, 2024.

https://global.medical.canon/products/computed-tomography/pcct?utm_source=WEB-TOP, viewed on Mar. 21, 2024.

* cited by examiner

DIRECT ATTACH RADIATION DETECTOR STRUCTURES INCLUDING PIXELATED SENSORS AND READ-OUT CIRCUITRY HAVING VARYING PITCH

FIELD

The present disclosure relates generally to radiation detectors, and more specifically to direct attach radiation detector structures including pixelated radiation sensors and read-out circuitry having varying pitch.

BACKGROUND

Room temperature pixelated radiation detectors made of semiconductors, such as cadmium zinc telluride ($Cd_{1-x}Zn_xTe$ where $0<x<1$, or "CZT"), are gaining popularity for use in medical and non-medical imaging. These applications use the high energy resolution and sensitivity of the radiation detectors.

SUMMARY

According to an aspect of the present disclosure, a detector structure includes at least one radiation sensor having an array of pixel detectors, an application specific integrated circuit (ASIC) having an array of unit cells, each unit cell including signal processing channel circuitry and a contact region on a front surface of the ASIC, where the contact region includes an input node to the signal processing circuitry of the unit cell, and a redistribution layer on the front surface of the ASIC, the redistribution layer including at least one bonding region laterally displaced from, and electrically connected to, a contact region of a unit cell, and a plurality of bonding material portions, each of the bonding material portions extending between a respective pixel detector of the array of pixel detectors and the front surface of the ASIC, where at least a portion of the bonding material portions contact a bonding region of the redistribution layer.

According to another aspect of the present disclosure, a detector structure comprises at least one radiation sensor comprising an array of pixel detectors having a first pitch between adjacent pixel detectors, and an application specific integrated circuit (ASIC) comprising an array of unit cells having a second pitch between adjacent pixel detectors, each unit cell comprising signal processing channel circuitry and a contact region on a front surface of the ASIC that comprises an input node to the signal processing circuitry of the unit cell. The first pitch is greater than the second pitch, the at least one radiation sensor is mounted over the front surface of the ASIC such that each pixel detector is electrically coupled to a contact region of a respective unit cell of the ASIC, a first plurality of the unit cells of the ASIC comprise active unit cells that include a contact region that is electrically coupled to a pixel detector of the at least one radiation sensor, and a second plurality of the unit cells of the ASIC comprise inactive unit cells that are not electrically coupled to a pixel detector of the at least one unit sensor.

Further embodiments include detector arrays including a plurality of the above-described detector structures, where the radiation sensors of the plurality of detector structures form a continuous detector surface of the detector array.

Further embodiments include X-ray imaging systems including a radiation source configured to emit an X-ray beam, and a detector array including a plurality of the above-described detector structures that are configured to receive the X-ray beam from the radiation source through an intervening space configured to contain an object therein.

DETAILED DESCRIPTION

Figure 1A:
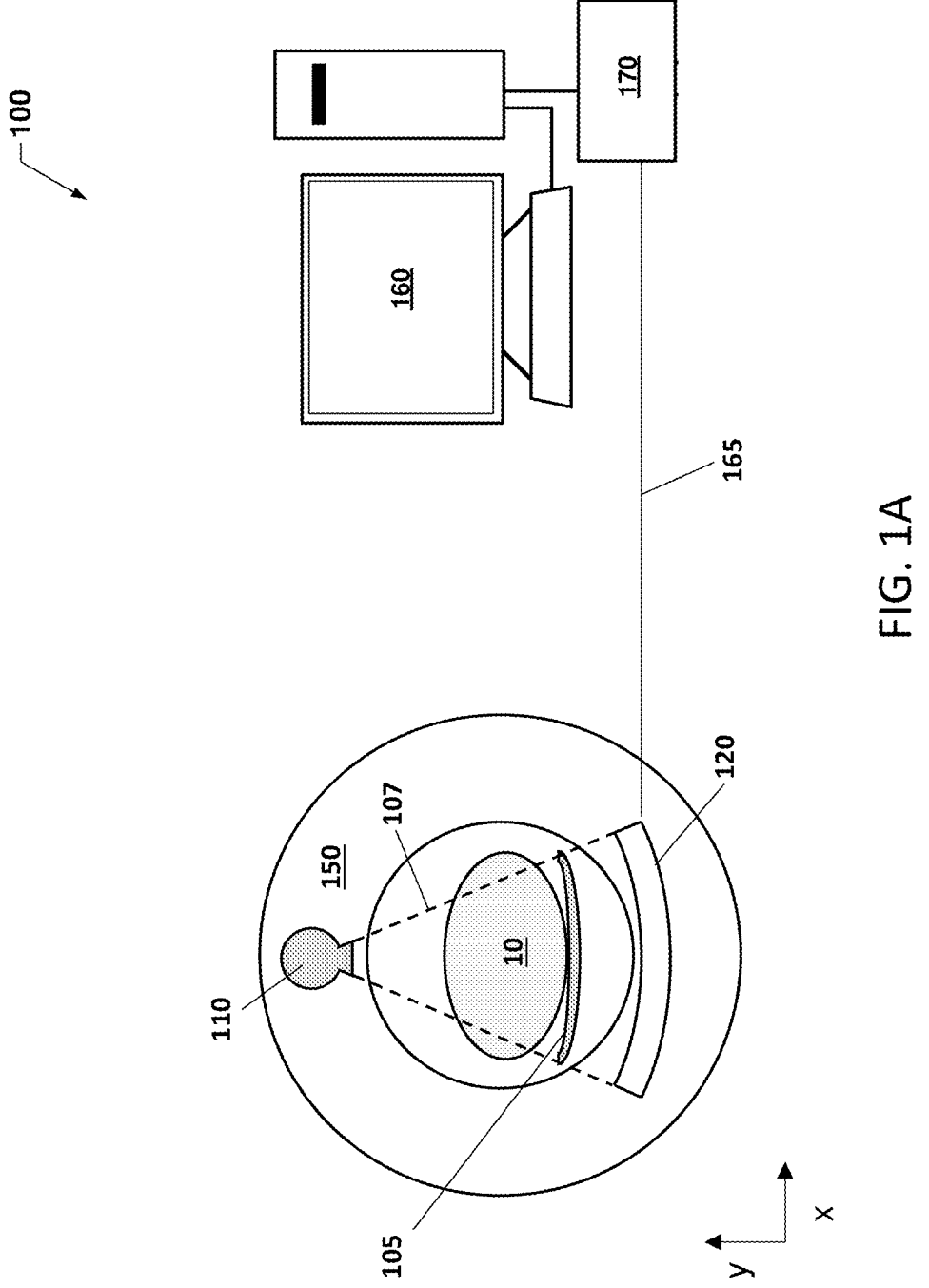
FIGS. 1A and 1B are functional block diagrams of an X-ray imaging system in accordance with various embodiments of the present disclosure.

Embodiments of the present disclosure provide detector structures, such as radiation detector units and radiation detector modules, and detector arrays formed by assembling the detector structures, and methods of manufacturing the same, the various aspects of which are described herein with reference to the drawings.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims. Any reference to claim elements in the singular, for example, using the articles "a," "an," or "the" is not to be construed as limiting the element to the singular. The terms "example," "exemplary," or any term of the like are used herein to mean serving as an example, instance, or illustration. Any implementation described herein as an "example" is not necessarily to be construed as preferred or advantageous over another implementation. The drawings are not drawn to scale. Multiple instances of an element may be duplicated where a single instance of the element is illustrated, unless absence of duplication of elements is expressly described or clearly indicated otherwise.

Ionizing radiation detectors, such as X-ray detectors, typically include a radiation-sensitive sensor material that is operatively coupled to detector read-out electronics. In most modern radiation detectors, the detector read-out electronics includes at least one semiconductor integrated circuit (IC), such as an application specific integrated circuit (ASIC) (which may also be referred to as a read out integrated circuit, or ROIC). Ionizing radiation detectors generally fall within two broad categories: energy integrating (EI) detectors and photon counting (PC) detectors. In EI detectors, the radiation-sensitive sensor material is commonly a solid-state scintillator material that is coupled to a photodiode. The scintillation light generated by the sensor material is proportional to both the energy of each photon incident on the sensor material as well as the number of incident photons per unit time. The photodiode converts the scintillation light to an electric signal that is amplified and integrated by the read-out electronics to produce the output signal.

In contrast, in a photon counting (PC) detector, the sensor material is typically a semiconductor material, such as cadmium telluride (CdTe), cadmium zinc telluride (CZT), silicon (Si), gallium arsenide (GaAS), etc., that is configured to directly detect photon interactions occurring within the sensor material. Photon interactions within the sensor material produce a cloud of charge carriers (e.g., via the photoelectric effect). A bias voltage applied to the sensor material produces an electric field that causes the charge carriers produced by the photon interactions to be swept towards electrodes located on opposite sides of the sensor material. The charge that is received at the electrodes produces a signal that may be amplified and converted into a voltage signal by the detector read-out electronics. The read-out electronics may additionally include a "comparator" that compares the amplitude of the voltage signal to a pre-set threshold value, and a "counter" that measures the total number of voltage signals that exceed the pre-set threshold value, thus providing a total count of photons that impinge on the detector. The pre-set threshold is typically set to distinguish between "true" photon interaction event signals and electronic noise signals. Thus, a PC detector may have less noise than an energy integrating (EI) detector.

A spectral photon counting (SPC) detector is a type of PC detector that utilizes multiple pre-set threshold values to sort each of the detected voltage signals into different "bins" representing different energies of the incident photons. The read-out electronics of an SPC detector may sort incident photons into one or more energy bins by comparing the amplitudes of each of the detected voltage signals to a plurality of different threshold values. The total number of energy bins may be between 2 and 12 bins, for example. Thus, an SPC detector may provide both image information and measurements of the energy of the detected photons. An SPC detector may also be referred to as an energy-discriminating radiation detector.

Figure 1B:
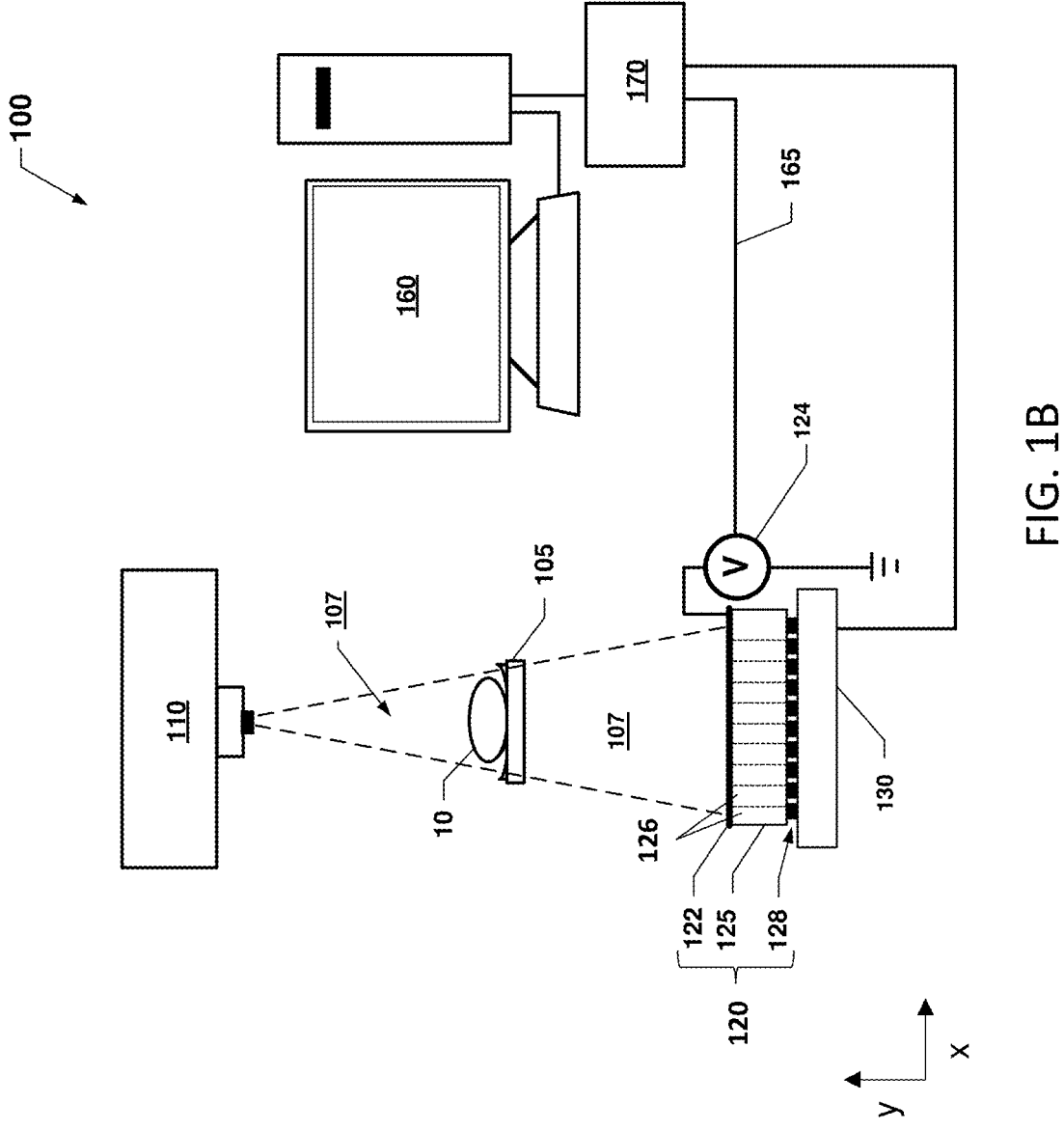

SPC detectors have been used for X-ray imaging applications, including for X-ray computed tomography (CT) imaging. FIGS. 1A and 1B are functional block diagrams of an X-ray imaging system 100 in accordance with various embodiments. The X-ray imaging system 100 may include an X-ray source 110 (i.e., a source of ionizing radiation), and an energy discriminating photon counting radiation detector 120. The X-ray imaging system 100 may additionally include a patient support structure 105, such as a table or frame, which may rest on the floor and may support an object 10 to be scanned. In some embodiments, the object 10 may be a biologic subject (i.e., a human or animal patient). The support structure 105 may be stationary (i.e., non-moving) or may be configured to move relative to other elements of the X-ray imaging system 100, such as the X-ray source 110.

As shown in FIG. 1A, the X-ray source 110 may be mounted to a gantry 150 and may move or remain stationary relative to the object 10. The X-ray source 110 is configured to deliver ionizing radiation to the radiation detector 120 by emitting an X-ray beam 107 toward the object 10 and the radiation detector 120. After the X-ray beam 107 is attenuated by the object 10, the beam of radiation 107 is received by the radiation detector 120.

The radiation detector 120 may be segmented or configured into a large number of small "pixel" detectors, as described in further detail below. The radiation detector 120 may a spectral photon counting (SPC) detector that includes a radiation-sensitive sensor material, such as semiconductor material, coupled to detector read-out electronics (e.g., one or more above-described ASICs).

A control unit 170 may be configured to control the operations of the X-ray source 110 and the radiation detector 120. The control unit 170 may be coupled to and operated from a computing device 160. Alternatively, the computing device 160 and the control unit 170 may be integrated together as one device.

In the exemplary embodiment shown in FIGS. 1A and 1B, the X-ray imaging system 100 is an X-ray computed tomography (CT) imaging system 100. The CT imaging system 100 may include a gantry 150, which may include a moving part, such as a circular, rotating frame with the X-ray source 110 mounted on one side and the radiation detector 120 mounted on the other side. The radiation detector 120 may have a curved shape along its long axis (i.e., the x-axis direction in FIG. 1A) such that each of the pixel detectors along the length of the radiation detector may face towards the focal spot of the X-ray source 110. The gantry 150 may also include a stationary (i.e., non-moving) part (not shown in FIG. 1A), such as a support, legs, mounting frame, etc., which rests on the floor and supports the moving part. The X-ray source 110 may emit a fan-shaped or cone-shaped X-ray beam 107 as the X-ray source 110 and the radiation detector 120 rotate on the moving part of the gantry around the object 10 to be scanned. After the X-ray beam 107 is attenuated by the object 10, the X-ray beam 107 is received by the radiation detector 120. The curved shape of the radiation detector 120 may allow the CT imaging system 100 to create a 360° continuous circular ring of the image of the object 10 by rotating the moving part of the gantry around the object 10.

For each complete rotation of the X-ray source 110 and the radiation detector 120 around the object 10, one cross-sectional slice of the object 10 may be acquired. As the X-ray source 110 and the radiation detector 120 continue to rotate, the radiation detector 120 may take numerous snapshots called "views". Typically, about 1,000 profiles are taken in one rotation of the X-ray source 110 and the radiation detector 120. The X-ray source 110 and the detector 120 may slowly move relative to the patient along a horizontal direction (i.e., into and out of the page in FIG. 1A) so that the detector 120 may capture incremental cross-sectional profiles over a region of interest (ROI) of the object 10, which may include the entire object 10. The data acquired by the radiation detector 120 may be passed along to the computing device 160 that may be located remotely from the radiation detector 120 via a connection 165. The connection 165 may be any type of wired or wireless connection. If the connection 165 is a wired connection, the connection 165 may include a slip ring electrical connection between any structure (e.g., gantry) supporting the radiation detector 120 and a stationary support part of the support structure, which supports any part (e.g., a rotating ring). If the connection 165 is a wireless connection, the radiation detector 120 may contain any suitable wireless transceiver to communicate data with another wireless transceiver that is in communication with the computing device 160. The computing device 160 may include processing and imaging applications that analyze each profile obtained by the radiation detector 120, and a full set of profiles may be compiled to form a three-dimensional computed tomographic (CT) reconstruction of the object 10 and/or two-dimensional images of cross-sectional slices of the object 10.

Various alternatives to the design of the X-ray imaging system 100 of FIGS. 1A and 1B may be employed to practice embodiments of the present disclosure. X-ray imaging systems may be designed in various architectures and configurations. For example, an X-ray imaging system may have a helical architecture. In a helical X-ray imaging scanner, the X-ray source 110 and radiation detector 120 are attached to a freely rotating gantry 150. During a scan, a table moves the object 10 smoothly through the scanner, or alternatively, the X-ray source 110 and detector 120 may move along the length of the object 10, creating helical path traced out by the X-ray beam. Slip rings may be used to transfer power and/or data on and off the rotating gantry 150. In other embodiments, the X-ray imaging system may be a tomosynthesis X-ray imaging system. In a tomosynthesis X-ray scanner, the gantry may move in a limited rotation angle (e.g., between 15 degrees and 60 degrees) in order to detect a cross-sectional slice of the object 10. The tomosynthesis X-ray scanner may be able to acquire slices at different depths and with different thicknesses that may be reconstructed via image processing.

Figure 2A:
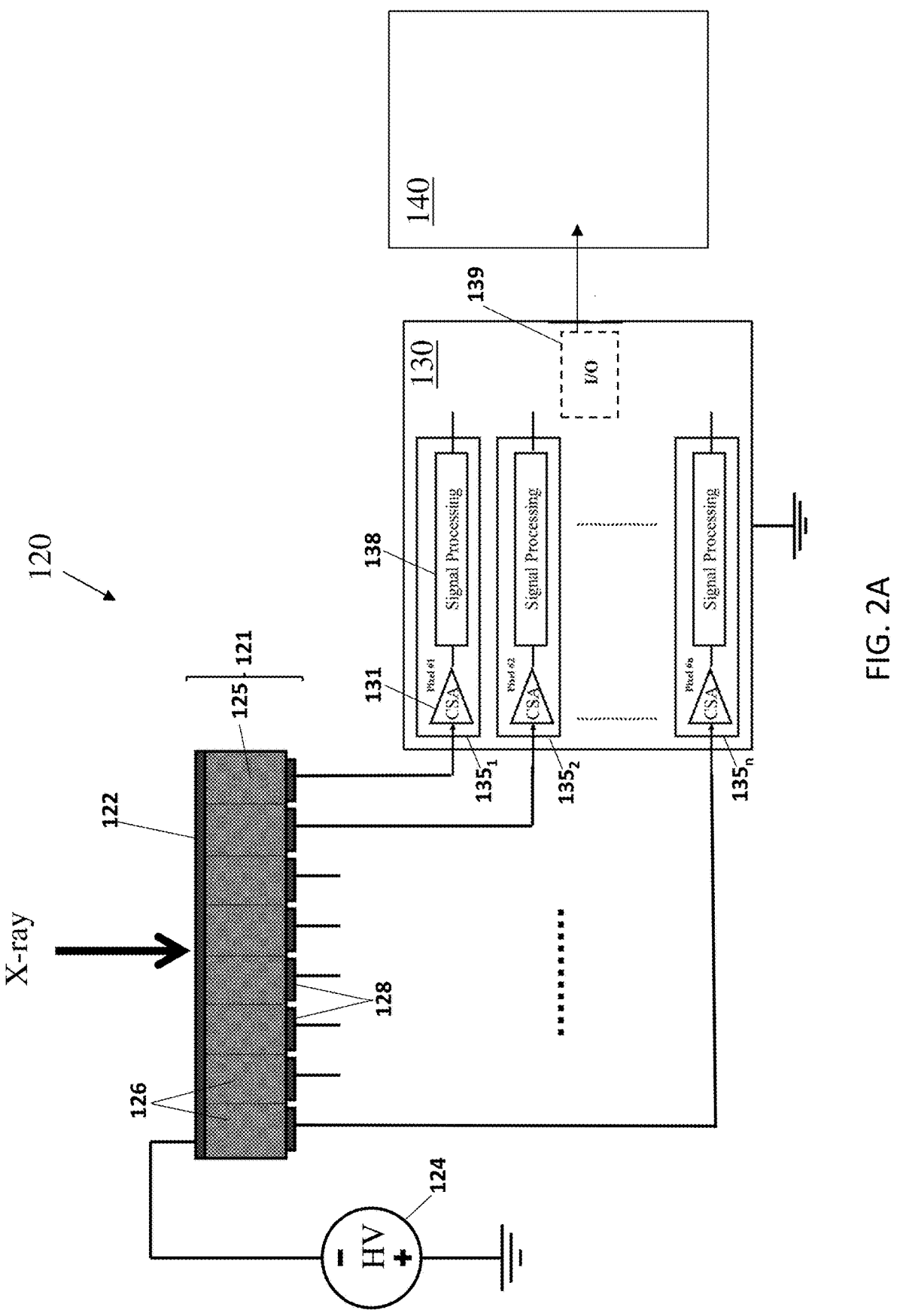
FIG. 2A schematically illustrates a radiation detector including a pixelated radiation sensor coupled to a detector application specific integrated circuit (ASIC) according to various embodiments of the present disclosure.

FIG. 2A schematically illustrates a radiation detector 120 including a pixelated radiation sensor 121 coupled to a detector application specific integrated circuit (ASIC) 130 according to various embodiments of the present disclosure. The radiation sensor 121 may be controlled by a high voltage bias power supply 124 that may selectively create an electric field between an anode 128 and cathode 122 pair coupled thereto. In one embodiment, the radiation sensor 121 includes a plurality of anodes 128 and one common cathode 122 electrically connected to the power supply 124. Each of the anodes 128 may define a different pixel detector 126 of a pixelated radiation detector 120. The radiation sensor 121 may include a detector material 125, such as a semiconductor material disposed between the anode(s) 128 and cathode 122 and thus configured to be exposed to the electrical field therebetween. In various embodiments, the radiation sensor 121 may be arranged such that the surface of the detector material 125 over which the cathode 122 is located faces towards the X-ray source 110 (see FIG. 1B). Thus, X-ray photons from the X-ray source 110 may impinge on the cathode-side of the radiation sensor 121. The semiconductor material 125 may include any suitable semiconductor material for detecting X-ray radiation disposed between the anode(s) 128 and cathode 122 and thus configured to be exposed to the electrical field therebetween. In various embodiments, the semiconductor material of the radiation sensor 121 may include a II-VI semiconductor material, such as cadmium telluride, cadmium zinc telluride (i.e., CdZnTe or "CZT"), cadmium selenide telluride, and cadmium zinc selenide telluride. Other suitable semiconductor materials are within the contemplated scope of disclosure.

An above-described detector application specific integrated circuit (ASIC) 130 may be coupled to the anode(s) 128 of the radiation sensor 121. The detector ASIC 130 may receive signals (e.g., charge or current) from the anode 128 (s) and be configured to provide data to and be controlled by a control unit 170 (see FIG. 1B). The signals received by the detector ASIC 130 may be in response to photon interaction events occurring within the radiation-sensitive semiconductor material of the detector material 125. Accordingly, the signals received by the detector ASIC 130 may be referred to as "event detection signals."

The detector ASIC 130 may include a semiconductor integrated circuit (IC) die that includes a substrate (e.g., a silicon substrate) including a semiconductor material layer over a surface of the substrate and a plurality of circuit elements (e.g., transistors, resistors, capacitors, inductors, diodes, etc.) formed on and/or in the semiconductor material layer. The circuit elements of the detector ASIC 130 may be configured to perform signal processing operations on event detection signals received from the anode(s) 128 of the radiation sensor 121. In particular, each anode 128 of the radiation sensor 121 may be electrically coupled to an input node of a respective signal processing chain or "channel" $135_1$, $135_2$, . . . $135_n$, of the detector ASIC 130. Thus, in various embodiments, event detection signals from each anode 128 of the radiation sensor 121 may be processed by a separate channel $135_1$, $135_2$, . . . $135_n$ of the ASIC 130. Accordingly, the total number of signal processing channels $135_1$, $135_2$, . . . $135_n$ of the ASIC 130 may be at least as great as the total number of pixel detectors 126 of the radiation sensor(s) 121 that are coupled to the ASIC 130. Each of the channels $135_1$, $135_2$, . . . $135_n$ of the ASIC 130 may include a respective amplifier 131 and signal processing circuitry 138.

Figures 2B, 2C:
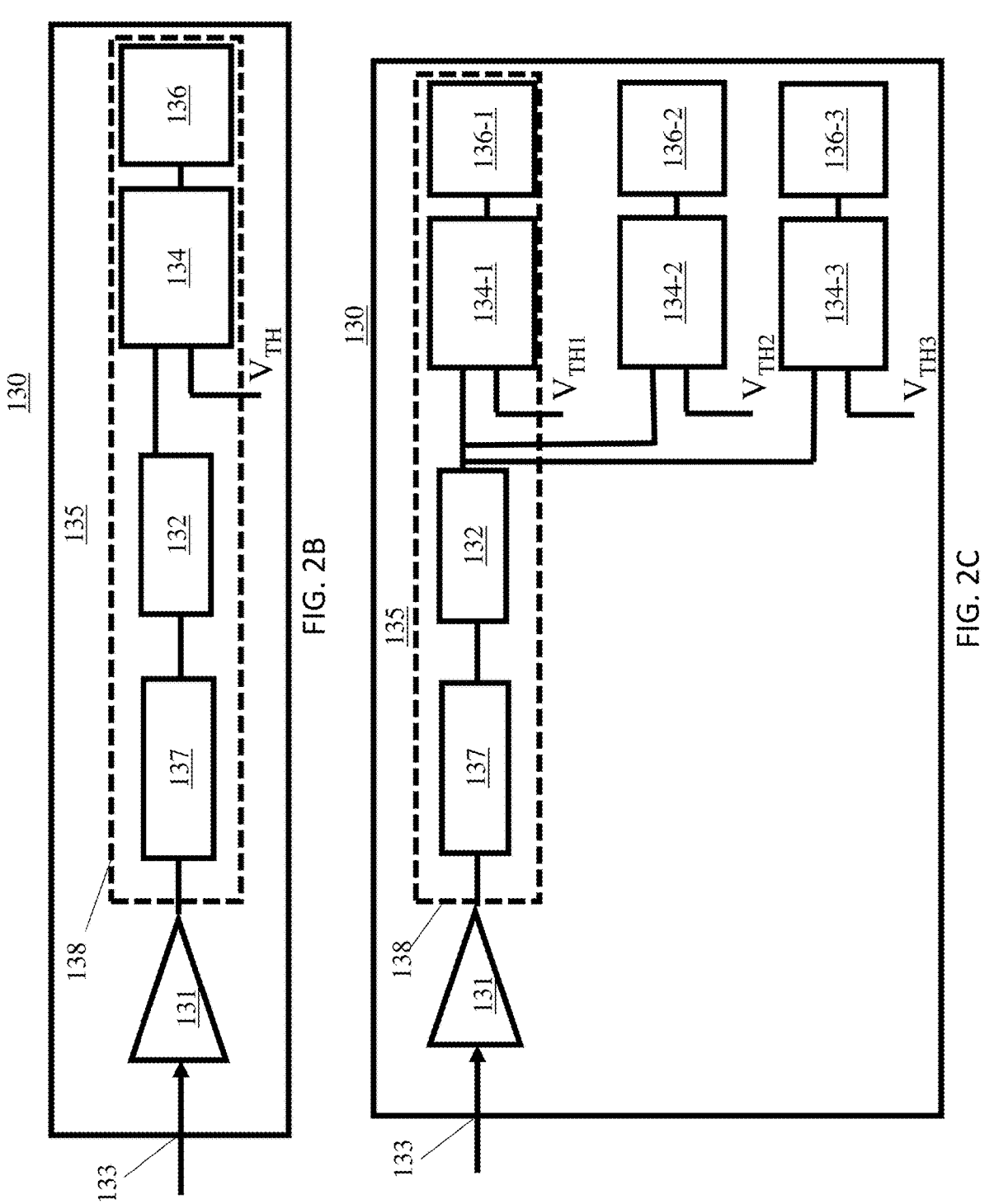
FIG. 2B is a schematic block diagram illustrating a signal processing channel of a detector ASIC for a photon counting (PC) radiation detector according to an embodiment of the present disclosure.
FIG. 2C is a schematic block diagram illustrating a signal processing channel of a detector ASIC for a spectral photon counting (SPC) radiation detector according to an embodiment of the present disclosure.

FIG. 2B is a schematic block diagram illustrating a signal processing channel 135 of a detector ASIC 130 for a photon counting (PC) radiation detector according to an embodiment of the present disclosure. Detection signals (e.g., analog charge signals) from an anode 128 of a radiation sensor 121 may be received at a channel input node 133, which may be, for example, a bond pad located on a surface of the ASIC 130. The detection signals may be fed to an amplifier 131 that may be configured to convert the charge signal to a voltage signal. In some embodiments, the amplifier 131 may be a charge sensitive amplifier (CSA). Alternatively, other types of amplifiers, such as a trans-impedance amplifier (TIA), may be utilized. The signal processing channel 135 may optionally include a base line restoration (BLR) circuit block 137 that may be used to preserve the reference (or baseline) level for the signal (i.e., the common mode voltage on top of which the differential-sensor-generated signal resides).

The signal processing channel 135 may additionally include a shaper circuit block 132 that may be configured to "shape" the signal that is output by the amplifier 131. For example, the shaper circuit block 132 may "shape" (i.e., modify one or more characteristics of) the voltage signal from the amplifier 131 within the time-domain or frequency-domain to enable the amplitude of the signal to be read with high accuracy. Alternatively, or in addition, the shaper circuit block 132 may include a filter (e.g., a band-pass filter) that may modify the spectral characteristics of the signal within the frequency-domain.

The signal processing channel 135 may additionally include a discrimination circuit block. In the embodiment shown in FIG. 2B, the discrimination circuit block includes a comparator circuit 134. The comparator circuit 134 compares the signal output from the shaper circuit block 132 with a reference signal. The reference signal may be maintained at a threshold voltage, $V_{TH}$, that represents a cut-off reference photon energy. For example, to detect photons having an energy over 20 keV, the reference signal may be set at a threshold voltage, $V_{TH}$, that is the equivalent of the signal produced by a 20 keV photon interaction event. The threshold voltage, $V_{TH}$, for a given cut-off reference photon energy may be determined using a calibration process. When the amplitude of a signal from the shaper circuit block 132 is determined to be greater than the threshold voltage, $V_{TH}$, a counter circuit block 136 may increment a count of detected photon interaction events.

FIG. 2C is a schematic block diagram illustrating a signal processing channel 135 of a detector ASIC 130 for a spectral photon counting (SPC) radiation detector according to an embodiment of the present disclosure. The signal processing channel 135 of FIG. 2C may include an amplifier 131, an optional BLR circuit block 137, and a shaper circuit block 132 as described above with reference to FIG. 2A. The signal processing channel 135 for an SPC radiation detector may differ from the signal processing channel 135 in FIG. 2A in that the output signal from the shaper circuit block 132 may be provided to a plurality of different comparator circuits 134-1, 134-2, 134-3, etc. Each comparator circuit 134-1, 134-2, 134-3 may compare the amplitude of the signal from the shaper circuit block 132 to a different threshold voltage, $V_{TH1}$, $V_{TH2}$, and $V_{TH3}$, that represents a different cut-off reference photon energy. A plurality of counter circuit blocks 136-1, 136-2 and 136-3 associated with the respective comparator circuits 134-1, 134-2 and 134-3 may increment a count of detected photon interaction events when the detected signal amplitude is greater than the respective threshold voltage, $V_{TH1}$, $V_{TH2}$, and $V_{TH3}$. The threshold voltages $V_{TH1}$, $V_{TH2}$, and $V_{TH3}$ may be set to define different ranges or "bins" of photon energies. Thus, in an example where $V_{TH1}$ corresponds to a cut-off reference photon energy of 20 keV, $V_{TH2}$ corresponds to a cut-off reference photon energy of 50 keV, and $V_{TH3}$ corresponds to a cut-off reference photon energy of 80 keV, photons having energies between 20-50 keV may be classified in a first energy bin, photons having energies between 50-80 keV may be classified in a second energy bin, and photons having energies >80 keV may be classified in a third energy bin. Although FIG. 2C illustrates a signal processing channel 135 that includes three sets of comparator circuits 134-1, 134-2 and 134-3 and counter circuit blocks 136-1, 136-2 and 136-3, it will be understood that the signal processing channels 135 of an ASIC 130 for an SPC radiation detector may have a greater or lesser number of sets of comparator circuits 134-1, 134-2 and 134-3 and counter circuit blocks 136-1, 136-2 and 136-3, such as between 2 and 8 sets of comparator circuits 134-1, 134-2 and 134-3 and counter circuit blocks 136-1, 136-2 and 136-3.

An ASIC 130 for an SPC radiation detector 120 may include a plurality (e.g., hundreds) of identical or substantially-identical signal processing channels 135 as shown in FIG. 2C. Each channel 135 may be electrically coupled to an anode electrode 128 of a particular pixel detector 126 and may output photon count data of photon interaction events occurring within the particular pixel detector 126 over multiple energy bins. Referring again to FIG. 2A, the ASIC 130 may further include input/output (I/O) circuitry 139 that may be configured to transmit the photon count data from the ASIC 130 to another electronic component of the imaging system 100. In some embodiments, the I/O circuitry 139 may include high-speed I/O circuitry, such as low voltage differential signaling (LVDS) transmission circuitry.

Referring once again to FIG. 2A, in addition to the above-described ASIC 130, the read-out circuitry for the radiation detector 120 may include at least one additional processor 140, such as a field programmable gate array (FPGA). Other suitable processors are within the contemplated scope of disclosure. The at least one additional processor 140 may function as a downstream aggregator of photon count data output from the ASIC 130 and may optionally perform additional signal processing on the photon count data. In some embodiments, the at least one additional processor 140 may be used for configuration of the ASIC 130.

The ASIC 130 is typically manufactured using semiconductor fabrication processes, and thus the layout and connectivity patterns of the circuit elements are normally fixed during the semiconductor device design and fabrication processes and generally cannot be altered in the field. By contrast, the additional processor(s) 140 may include an FPGA or other processing device that may be programmed in the field using fuses or similar technology.

In some embodiments, radiation detector 120 may have a modular configuration including a plurality of detector modules mounted on a common support structure, such as a detector array frame, to form a detector array (also known as a detector module system (DMS)) that includes a plurality of pixel detectors 126 extending over a continuous one-dimensional (1D) or two-dimensional (2D) detector array surface. Each detector module may include at least one above-described radiation sensor 121, at least one ASIC 130 electrically coupled to the at least one radiation sensor, and a module circuit board. The module circuit board may support transmission of electrical power, control signals, and data signals between the module circuit board and the at least one ASIC 130 and the at least one radiation sensor 121 of the detector module, and may further support transmission of electrical power, control signals, and data signals between the module circuit board and the control unit 170 of the X-ray imaging system 100, other module circuit boards of the detector array, and/or a power supply for the detector array.

Figures 3A, 3B:
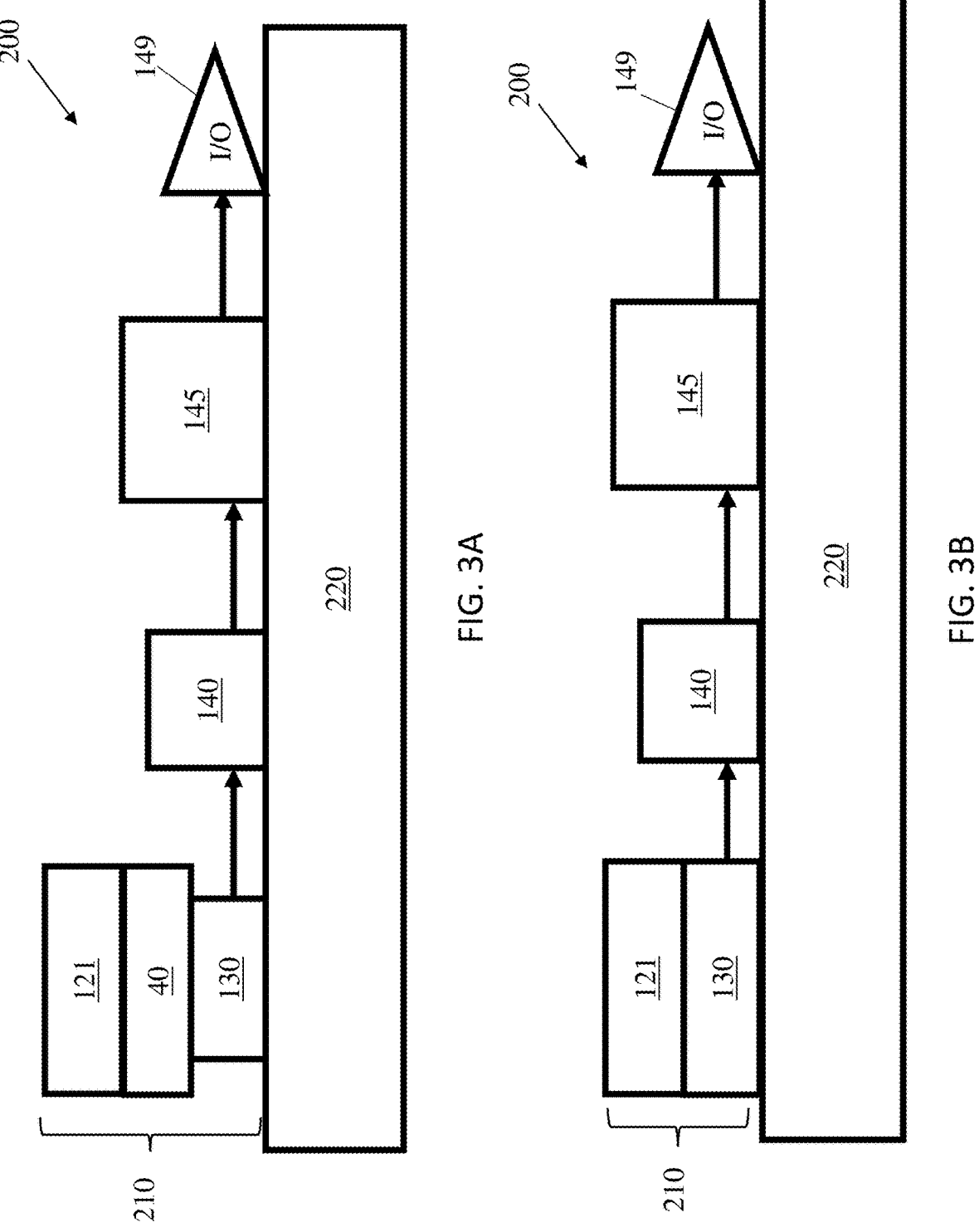
FIG. 3A schematically illustrates an "indirect attach" radiation detector unit that includes an interposer located between a radiation sensor and an ASIC.
FIG. 3B schematically illustrates a "direct attach" radiation detector unit that includes a radiation sensor directly mounted to an ASIC without an interposer or similar intervening structural component in accordance with various embodiments of the present disclosure.

FIGS. 3A and 3B are functional block diagrams that schematically illustrate examples of detector modules 200 according to various aspects of the present disclosure. In the examples shown in FIGS. 3A and 3B, the detector modules 200 include a single radiation sensor 121 and ASIC 130 electrically coupled to a module circuit board 220. However, it will be understood that a detector module 200 may include more than one radiation sensor 121 and/or ASIC 130. In some embodiments, a detector module 200 may be constructed from a set of radiation detector units 210, which may also be referred to as "mini-modules" or "submodules." In some embodiments, each of the radiation detector units 210 may include one or more radiation sensors 121 coupled to a single ASIC 130. In the embodiment detector modules 200 shown in FIGS. 3A and 3B, an above-described additional processor 140 (e.g., an FPGA) is electronically coupled to the ASIC 130, and a local memory storage 145 may be electronically coupled to the additional processor 140. The local memory storage 145 may be SRAM, DRAM, or any other type of volatile or non-volatile memory. In some embodiments, the local memory storage 145 may be used to temporarily store image data (e.g., photon count data) before the data is output to an external component, such as a downstream aggregation point on the detector array and/or an external computing device (e.g., computing device 160 in FIG. 1B). The detector modules 200 may additionally include input/output (I/O) circuitry 149. In some embodiments, the additional processor 140, the local memory storage 145 and the I/O circuitry 149 may be located on the module circuit board 220.

FIGS. 3A and 3B schematically illustrate two different configurations for mounting a radiation sensor 121 to an ASIC 130 to provide a radiation detector unit 210. FIG. 3A illustrates an "indirect attach" radiation detector unit 210 that includes an interposer 40 located between radiation sensor 121 and the ASIC 130. The interposer 40 may include an insulating matrix having conductive (e.g., metal) interconnect structures (not shown in FIG. 3A) embedded therein. Bonding pads (not shown in FIG. 3A) may be located on the front side and the back side of the interposer 40 and may be electrically coupled to the conductive interconnect structures. As used herein, the "front side" of elements refers to the side that faces the incoming radiation, and the "backside" of elements refers to the side that is the opposite side of the front side. The radiation sensor 121 may be mounted to the front side of the interposer 40 via an array of bonding structures (e.g., copper pillars, solder balls, etc.) located between bonding pads on the back side of the radiation sensor 121 and the bonding pads on the front side of the interposer 40. The ASIC 130 may be mounted to the back side of the interposer 40 via an array of bonding structures (e.g., copper pillars, solder balls, etc.) located between bonding pads on the front side of the ASIC 130 and the bonding pads on the back side of the interposer 40. The conductive interconnect structures of the interposer 40 may route detection signals from the anodes 128 of each pixel detector 126 of the radiation sensor 121 through the interposer 40 to a corresponding signal processing channel 135 of the ASIC 130. Exemplary embodiments of "indirect attach" radiation detector units 210 and detector modules

200 including an interposer 40 are described, for example, in U.S. Pat. No. 11,067,707 to Crestani et al., the entire teachings of which are incorporated by reference herein for all purposes.

FIG. 3B illustrates a "direct attach" radiation detector unit 201 that includes a radiation sensor 121 directly mounted to an ASIC 130 without an interposer or similar intervening structural component such that each pixel detector 126 is located over and is directly electrically connected to a corresponding signal processing channel of the ASIC 130. In particular, a plurality of bonding structures (e.g., copper pillars, solder balls, conductive epoxy material, etc.) may extend between an array of bonding pads located on the back side of the radiation sensor 121 and an array of bonding pads located on the front side of the ASIC 130 to directly connect each of the pixel detectors 126 to an input of a signal processing channel 135 of the ASIC 130. Exemplary embodiments of "direct attach" radiation detector units 210 and detector modules 200 are described, for example, in U.S. Provisional Patent Application No. 63/380,769, filed on Oct. 25, 2022, and U.S. patent application Ser. No. 18/158, 695, filed on Jan. 24, 2023, the entire teachings of both of which are incorporated by reference herein for all purposes.

One potential advantage of an "indirect attach" detector configuration as shown in FIG. 3A is that because an interposer 40 is used to route signals between the pixel detectors 126 of the radiation sensor 121 and the channel inputs of the ASIC 130, the bonding pads on the back side of the radiation sensor 121 and the bonding pads on the front side of the ASIC 130 do not need to have the same pattern and/or periodicity. Thus, the ASIC 130 may have a different (e.g., smaller) horizontal cross-sectional area than the horizontal cross-sectional area of the radiation sensor 121 and may include input nodes to the respective signal processing channels 135 that have a spacing (i.e., pitch) that is different than the spacing between the corresponding anode electrodes 128 of the radiation sensor 121. However, a drawback of an "indirect attach" detector configuration is that the interposer 40 may increase the input node capacitance at the ASIC 130 which may result in an increase in equivalent noise charge (ENC) and higher power consumption.

A "direct attach" detector configuration as shown in FIG. 3B may result in reduced input node capacitance compared to an equivalent indirect attach detector having an interposer 40 (e.g., 0.2 pF vs. 1.0 pF). This may result in lower power consumption (e.g., 0.2 mW/channel compared to 0.8 mW/channel using an interposer) and lower equivalent noise charge (ENC) (e.g., 250 e− vs, 700 e− using an interposer). However, because each pixel detector 126 of the radiation sensor 121 is directly coupled (e.g., via a bonding structure) to the input node of the corresponding signal processing channel 135 of the ASIC 130, the horizontal dimensions of the ASIC 130 may need to be equivalent to, or greater than, the corresponding horizontal dimensions of the radiation sensor(s) 121 mounted to the front side of the ASIC 130. In addition, in a comparative "direct attach" radiation detector unit 210 or detector module 200, the layout (e.g., pattern and periodicity) of the bonding pads on the front side of the ASIC 130 must be identical to the layout of the corresponding bonding pads on the back side of the radiation sensor(s) 121.

Figure 4:
FIG. 4 is a vertical cross-sectional view of a comparative "direct attach" radiation detector unit.

FIG. 4 is a vertical cross-sectional view of a comparative "direct attach" radiation detector unit 210. Referring to FIG. 4, the radiation detector unit 210 includes a radiation sensor 121 coupled to an ASIC 130. The radiation sensor 121 may include an above-described detector material 125 having at least one cathode electrode 122 on a front side of the radiation sensor 121 and a plurality of anode electrodes 128 on a back side of the radiation sensor 121 defining an array of pixel detectors 126 as described above. The radiation sensor 121 may be directly mounted to the front side of the ASIC 130 via a plurality of bonding material portions 82. In other words, the radiation sensor 121 may be mechanically and electrically coupled to the ASIC 130 via the plurality of bonding material portions 82, and no interposer or similar intervening structural component for routing of electrical signals between the radiation sensor 121 and the ASIC 130 is located between the back side of the radiation sensor 121 and the front side of the ASIC 130. As discussed above, directly mounting the radiation sensor(s) 121 to the front side of the ASIC 130 may provide a significant reduction in input node capacitance as compared to a radiation detector unit that includes an interposer 40 located between the radiation sensor(s) 121 and the ASIC 130.

The plurality of bonding material portions 82 may be arranged in an array, such as a rectangular array, having the same periodicity as the periodicity of the anode electrodes 128 on the back side of the radiation sensor 121. Thus, each bonding material portion 82 may electrically couple a respective anode electrode 128 of the radiation sensor 121 to the front side of the ASIC 130. In one non-limiting embodiment, the bonding material portions 82 may be composed of a conductive epoxy. Other suitable bonding materials, such as a low temperature solder material with under bump metallization, may be utilized to mount the radiation sensor 121 to the front side of the ASIC 130.

In various embodiments, the ASIC 130 may include an arrangement of circuit components located on and/or within a single supporting substrate, which may be a semiconductor material substrate (e.g., a silicon substrate). In various embodiments, the ASIC 130 may include an array of active circuit regions 181 that may each include an above-described signal processing channel 135 for a pixel detector 126 of the radiation sensor 121. In various embodiments, the horizontal dimensions of the ASIC 130 may generally correspond to the dimensions of the radiation sensor(s) 121 mounted over the front side of the ASIC 130. In particular, the dimensions of the ASIC 130 along respective orthogonal horizontal directions (i.e., within a horizontal plane containing a first horizontal direction hd1) may be substantially equal (e.g., within ±4%, such as ±0-2%) to the dimensions of the radiation sensor(s) 121 mounted to the ASIC 130 along the same horizontal directions. In the embodiment illustrated in FIGS. 3A and 3B, a single radiation sensor 121 is mounted to the front side of the ASIC 130, although it will be understood that in other embodiments, multiple radiation sensors 121 may be mounted to the front side of the ASIC 130, such that the horizontal dimensions of the ASIC 130 may be substantially equal to the combined dimensions of the multiple radiation sensors 121 along the corresponding horizontal directions. In some embodiments, the ASIC 130 and each of the radiation sensors 121 mounted thereto may have a rectangular periphery. This may enable any of the four peripheral sides of the radiation detector unit 210 to be abutted against a peripheral side of an adjacent radiation detector unit 210 upon assembly of multiple radiation detector units 210 in a two-dimensional detector array.

Referring again to FIG. 4, the radiation sensor 121 may include array of contiguous pixel detectors 126 and the ASIC 130 may include a plurality of contiguous pixel regions 180 underlying each of the pixel detectors 126 of the radiation sensor 80, as indicated by the dashed lines in FIG. 4. A bonding material portion 82 may extend between each pixel detector 126 of the radiation sensor 121 and a corresponding pixel region 180 of the ASIC 130. Thus, as shown in FIG. 4, each pixel region 180 of the ASIC 130 includes a contact region 182 (e.g., a bond pad) in which a bonding material portion 82 contacts the front side of the ASIC 130. Each contact region 182 may be electrically coupled to an active circuit region 181 of the ASIC 130 and may function as an input node to a signal processing channel 135. In some embodiments, each pixel region 180 of the ASIC 130 (which may also be referred to as a "unit cell" of the ASIC) may include a contact region 182 and an active circuit region 181 that includes signal processing channel 135 circuitry for the pixel detector 126 of the radiation sensor 121 that overlies the pixel region 180. Each of the pixel regions 180 of the ASIC 130 may have horizontal dimensions that are substantially equal (e.g., within ±4%, such as ±0-2%) to the corresponding dimensions of the pixel detector 126 overlying the pixel region 180 of the ASIC 130. In some embodiments, the horizontal dimensions of each pixel region 180 may be in a range of 250-500 μm, although greater and lesser dimensions are within the contemplated scope of disclosure. In one non-limiting embodiment, each of the pixel regions 180 of the ASIC 130 may be a 330 μm×330 μm square. In other embodiments, the pixel regions 180 may be rectangular-shaped in which the different horizontal dimensions are not equal. In various embodiments, the plurality of pixel regions 180 may extend continuously over the entire area of the ASIC 130.

Referring again to FIG. 4, the radiation detector unit 210 may further include a carrier board 60 that is configured to route power supply to the ASIC 130 and to the at least one radiation sensor 121, control signals to the ASIC 130, and data signals (e.g., digital detection signals) generated by the ASIC 130. One or more cables 62, such as a flex cable assembly, may be attached to a respective side of the carrier board 60, and another end of each cable may be connected to the above-described module circuit board 220. The carrier board 60 may be a printed circuit board including an insulating substrate and printed interconnection circuits. In various embodiments, the ASIC 130 may be disposed over the carrier board 60 such that the back side of the ASIC 130 may contact the front side of the carrier board 60.

Referring again to FIG. 4, a plurality of through-substrate vias (TSVs) 190 may be provided in the ASIC 130. Each of the TSVs 190 may be located within a pixel region 180 of the ASIC 130. The TSVs 190 may include an electrically conductive material (e.g., a metal material, such as copper) that extends between the front side and the back side of the ASIC 130. In embodiments in which the ASIC 130 may be formed on and/or in a silicon substrate, the TSVs 190 may also be referred to as "through-silicon vias."

Accordingly, electrical connections between the carrier board 60 and the ASIC 130 may be made through the back side of the ASIC 130 via the plurality of TSVs 190. In particular, each of the TSVs 190 may electrically contact a conductive trace 191 located on the front side of the carrier board 60, as schematically illustrated in FIG. 4. This may obviate the need for wire bond and/or interposer connections between the front side of the carrier board 60 and the front side of the ASIC 130, which may help to minimize the footprint of the radiation detector unit 210. In various embodiments, outer periphery of the carrier board 60 may not extend beyond the outer periphery of the ASIC(s) 130 and radiation sensor(s) 121 located over the carrier board 60 so as to provide a radiation detector unit 210 that is buttable on all four sides.

In other embodiments, a portion of the ASIC 130 may extend beyond the outer periphery of the radiation sensor(s)

121 and a portion of the carrier board 60 may extend beyond the outer periphery of the ASIC 130. A plurality of wire bond connections may extend between the front side of the carrier board 60 and the front side of the ASIC 130, as is described and illustrated in the above-referenced U.S. patent application Ser. No. 18/158,695. The wire bond connections between the carrier board 60 and the ASIC 130 may be in addition to, or may be in lieu of, electrical connections between the front side of the carrier board 60 and the back side of the ASIC 130 via TSVs 190 as described above.

The TSVs 190 may be fabricated by forming plurality of deep openings in the ASIC substrate using photolithographic patterning and an anisotropic etching process, performing thin film deposition of insulating, barrier and/or metallic seed layers within each of the openings, and filling the openings with a metallic fill material via a suitable deposition process, such as an electrodeposition process. A thinning process, such as a grinding or chemical-mechanical planarization (CMP) process, may be used to remove material from the backside of the substrate to expose the TSVs 190. In some embodiments, the substrate may be thinned to a thickness of less than 200 μm, such as 10 to 150 μm, for example, 50 to 100 μm. The TSVs 190 may be formed using a "TSV first" process in which the plurality of TSVs 190 may be formed through a semiconductor material substrate (e.g., a silicon wafer) prior to fabricating the electronic circuit components (e.g., transistors, capacitors, resistors, etc.) of the ASIC 130 via front end of the line (FEOL) semiconductor fabrication processes. In other embodiments, the TSVs 190 may be formed after FEOL processes are complete but prior to the formation of metal interconnect structures via back end of the line (BEOL) fabrication processes. In still further embodiments, the TSVs 190 may be formed using a "TSV last" process either during or following the completion of BEOL processes. "TSV last" fabrication may provide the highest degree of flexibility, as the ASIC 130 may be initially fabricated at a silicon foundry and then subsequently processed to form the TSVs 190.

Each of the TSVs 190 may have horizontal dimensions (e.g., a diameter) between about 1 μm and about 200 μm, although greater and lesser dimensions for the TSVs 190 may also be utilized. In one non-limiting embodiment, the dimensions of the TSVs 190 along horizontal directions may be about 50 μm. As noted above, each of the TSVs 190 is located in a pixel region 180 of the ASIC 130 that underlies a pixel detector 126 of the radiation sensor 121. Thus, each of the TSVs 190 shares the pixel region 180 in which it is located with a contact region 181 that electrically couples the pixel region 180 to the overlying pixel detector 126 of a radiation sensor 121 via a bonding material portion 82. The TSVs 190 may be laterally spaced from the contact regions 182 to avoid electrically-shorting the bonding material portions 82 to the TSV 190. Metal interconnect structures (not shown in FIG. 4) on the front side of the ASIC 130 may electrically couple the TSVs 190 to the various circuit components (e.g., transistors, resistors, capacitors, etc.) of the ASIC 130. In the embodiment shown in FIG. 4, only a portion of the pixel regions 180 of the ASIC 130 include a TSV 190, although it will be understood that in other embodiments, all of the pixel regions 180 may include at least one TSVs 190. The total number of TSVs 190 may be sufficient to provide all the required electronic signaling (e.g., control signals and data output signals) between the ASIC 130 and the carrier board 60 as well as to provide all the required power to the ASIC 130.

As discussed above, the ASIC 130 is typically manufactured using semiconductor fabrication processes. Thus, the layout and connectivity patterns of the ASIC 130, including the arrangement of the pixel regions 180 and the center-to-center spacing (i.e., pitch) between contact regions 182 on the front side of the ASIC 130 are normally fixed during the semiconductor device design process. In many cases, the design of the ASIC 130 may be driven, at least in part, by the design of the radiation sensor(s) 121 that are mounted to the ASIC 130 to provide a radiation detector unit 210 and/or detector module 200. Accordingly, in the comparative radiation detector unit 210 as shown in FIG. 4, the size of the pixel regions 180 and the pitch between respective contact regions 182 of the ASIC 130 may be identical to the size of the pixel detectors 126 and the pitch of the anode electrodes 128 in the overlying radiation sensor 121.

However, there are often variations in the designs of different radiation sensors 121, including variations in the sizes of the pixel detectors 126 and/or in the pitch between adjacent pixel detectors 126. For example, some radiation sensors 121 may include pixel detectors 126 having non-uniform dimensions (i.e., some pixel detectors 126 of the radiation sensor 121 may have larger areas than other pixel detectors 126) and/or may have different pitches between adjacent anode electrodes 128. Such radiation sensors 121 may not be compatible with an ASIC 130 that was designed for use with a radiation sensor having a different pixel layout.

Various embodiments include an ASIC 130 for a direct attach spectral photon counting (SPC) radiation detector 120 that may be used with radiation sensors 121 in which the layout of the pixel detectors 126 of the radiation sensor 121 does not correspond to the layout of the unit cells 180 of the ASIC 130. In some embodiments, a redistribution layer including an electrically conductive (e.g., metal) material may be provided over the front side of the ASIC 130 to route detection signals from pixel detectors 126 of the radiation sensor 121 to the input nodes of the corresponding signal processing channels 135 of the ASIC 130. This provides an ASIC 130 having a fixed layout of unit cells 180 and contact regions 182 to be used with a variety of different radiation detectors 121 having different pixel detector 126 configurations, layouts and/or spacings.

Figure 5B:
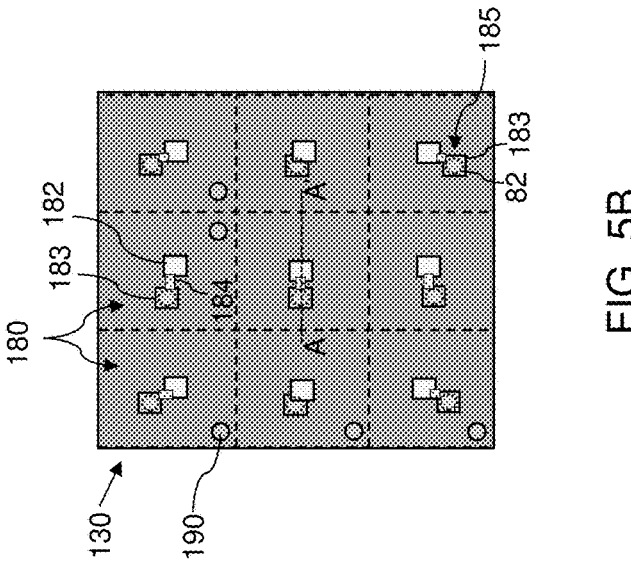
FIG. 5B illustrates the front side of an ASIC according to an embodiment of the present disclosure.
Figure 5A:
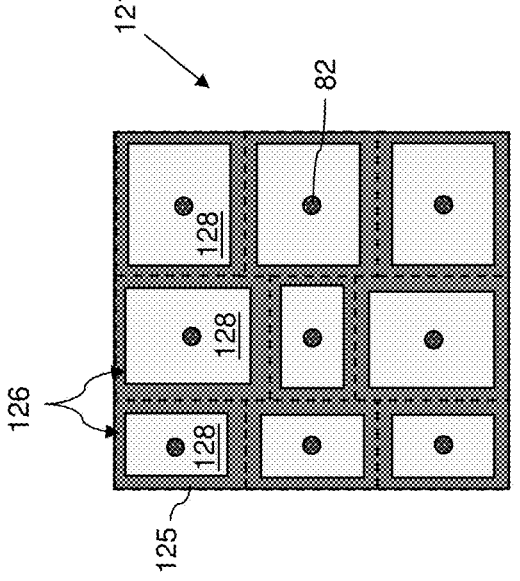
FIG. 5A illustrates the back side of a radiation sensor having a non-uniform layout of pixel detectors according to an embodiment of the present disclosure.
Figure 5C:
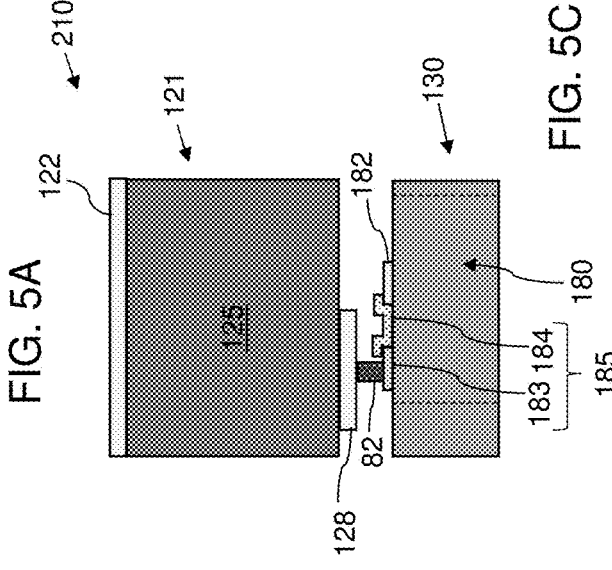
FIG. 5C is a vertical cross-section view of a portion of a radiation detector unit including the radiation sensor of FIG. 5A mounted over the front side of the ASIC of FIG. 5B according to an embodiment of the present disclosure.

FIG. 5A illustrates the back side of a radiation sensor 121 having a non-uniform layout of pixel detectors 126 according to an embodiment of the present disclosure. FIG. 5B illustrates the front side of an ASIC 130 according to an embodiment of the present disclosure. FIG. 5C is a vertical cross-section view of a portion of a radiation detector unit 210 including the radiation sensor 121 of FIG. 5A mounted over the front side of the ASIC 130 according to an embodiment of the present disclosure. The cross-section view of FIG. 5C is taken along line A-A' in FIG. 5B. Referring to FIG. 5A, the radiation sensor 121 may include an array of pixel detectors 126 each including a discrete anode electrode 128. The pixel detectors 126 may have non-uniform sizes in which the pixel detectors 126 may have variable horizontal cross-section areas. For example, in some detectors, the pixel detectors 126 along the edges of the radiation sensor 121 may be smaller than other pixel detectors 126 of the radiation sensor 121 in order to maintain consistent center-to-center pixel spacing when multiple abutting radiation sensors 121 are assembled into a larger-area array. Alternatively, or in addition, in some detector configurations, sets of neighboring pixel detectors 126, such as contiguous N×M regions of pixel detectors 126, may form "macro-pixels" that correspond to the geometry of an anti-scatter grid (ASG) located over the radiation sensor 121. Because the ASG may partially cover at least some of the pixel detectors 126 around the edges of the macro-pixels, it may be advantageous to vary the sizes of the pixel detectors 126 within each macro-pixel such that the pixel detectors 126 that are partially obscured by the ASG may have a larger area than pixel detectors 126 that are not obscured by the ASG. In any case, in a radiation sensor 121 having pixel detectors 126 with non-uniform sizes, the center-to-center spacing (i.e., pitch) between adjacent pixel detectors 126 of the radiation sensor 121 may be variable.

Referring to FIGS. 5B and 5C, the ASIC 130 may have a repeating pattern of unit cells 180. Each unit cell 180 may include a contact region 182 (e.g., a bond pad) electrically coupled to a circuit region 181 including signal processing channel circuitry. The contact region 182 may function as an input node 133 (see FIGS. 2B and 2C) to a signal processing channel 135 of the ASIC 130. At least some of the unit cells 180 may also include through-substrate vias 190 for providing power and/or data transmission for the ASIC 130. As shown in FIG. 5B, the unit cells 180 may form a periodic array (e.g., a rectangular array) in which each of the unit cells 180 has an identical size with a uniform center-to-center spacing (or pitch) between adjacent unit cells 180. In the embodiment shown in FIGS. 5B and 5C, the contact regions 182 of each unit cell 180 of the ASIC 130 are located in the center of each unit cell 180, although it will be understood that the contact regions 182 may be located in a different location within the unit cells 180.

In the embodiment shown in FIGS. 5A-5C, the ASIC 130 and the radiation sensor(s) 121 mounted thereto may have identical or substantially identical horizontal dimensions, and the total number of unit cells 180 on the ASIC 130 may be equal to the total number of pixel detectors 126 on the radiation sensor(s) 121. Thus, the nominal (e.g., average) pitch between the pixel detectors 126 of the radiation sensor(s) 121 may be the same as the pitch between unit cells 180 of the ASIC 130. For example, both the radiation sensor(s) 121 and the ASIC 130 may have a nominal pitch of 330 μm. However, due to the non-uniform sizes and variable pitch between pixel detectors 126 of the radiation sensor(s) 121, the locations of individual pixel detectors 126 may not correspond to the locations of the contact regions 182 of the corresponding unit cells 180 in the underlying ASIC 130.

Referring to FIGS. 5B and 5C, in various embodiments the ASIC 130 may further include a redistribution layer 185 including an electrically conductive (e.g., metal) material located over the front side of the ASIC 130. The redistribution layer 185 may route detection signals from pixel detectors 126 of the radiation sensor 121 to the input nodes 133 (i.e., contact regions 182) of the corresponding signal processing channels 135 in the unit cells 180 the ASIC 130. The redistribution layer 185 may include at least one bonding region 183 laterally displaced from and electrically connected (e.g., by physical contact or through an electrical connector, such as a conductive trace 184) to a contact region 182 of a unit cell 180 of the ASIC 130. Each bonding region 183 may be sized and shaped to contact an above-described bonding material portion 82 (as indicated by dashed circles in FIG. 5B) located between the front side of the ASIC 130 and an anode electrode 128 on the back side of the overlying radiation sensor 121. In some embodiments, at least a portion of the bonding regions 183 may directly contact a contact region 182 of a unit cell 180. In some embodiments, the redistribution layer 185 may further include at least one conductive trace 184 extending between a bonding region 183 and a contact region 182 of a unit cell 180. Thus, the bonding regions 183 that underlie and are connected to a pixel detector 126 via a bonding material portion 82 need not be co-located with the unit cell 180 of the ASIC 130 that includes the signal processing channel circuitry for the pixel detector 126. In some embodiments, at least some of the pixel detectors 126 may be coupled to bonding region 183 that is located partially or completely outside of the peripheral edges of the unit cell 180 that includes the signal processing channel circuitry for the pixel detector 126.

In various embodiments, the redistribution layer 185 may be formed by depositing a suitable conductive material (e.g., a metal or metal alloy) over the front side of the ASIC 130 and patterning the conductive material (e.g., via photolithography and etching processes) to form a plurality of bonding regions 183 and optional conductive traces 184 contacting respective contact regions 182 in the unit cells 180 of the ASIC 130. The pattern of the redistribution layer 185 may be customized based on the layout of the pixel detectors 126 of the radiation sensor 121 that is to be mounted over the front side of the ASIC 130. Thus, in cases in which the layout of the radiation sensor 121 does not correspond to the layout of the unit cells 180 of the ASIC 130, the redistribution layer 185 may enable each pixel detector 126 of the radiation sensor 121 to be electrically coupled to a corresponding contact region 182 of the ASIC 130.

Figures 6A, 6B, 6C:
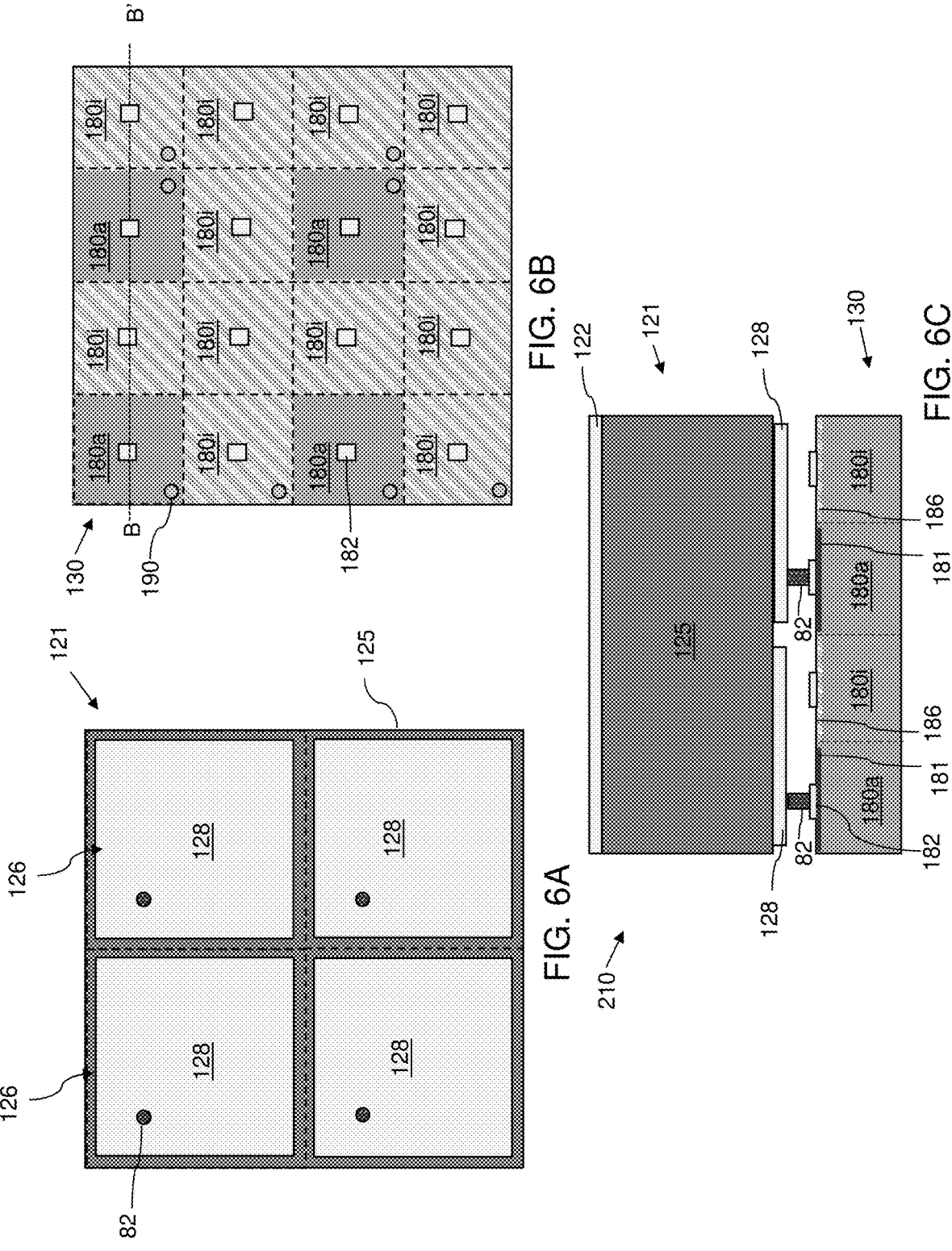
FIG. 6A illustrates the back side of a radiation sensor including an array of pixel detectors having a first pitch between adjacent pixel detectors according to an embodiment of the present disclosure.
FIG. 6B illustrates the front side of an ASIC including an array of unit cells having a second pitch between adjacent unit cells according to an embodiment of the present disclosure.
FIG. 6C is a vertical cross-section view of a portion of a radiation detector unit including the radiation sensor of FIG. 6A mounted over the front side of the ASIC of FIG. 6B according to an embodiment of the present disclosure.

Further embodiments illustrated in FIGS. 6A-6C include direct attach SPC radiation detector units 210 and/or detector modules 200 that include at least one radiation sensor 121 mounted to an ASIC 130, where the at least one radiation sensor 121 includes a plurality of pixel detectors 126 having a first pitch and the ASIC 130 includes a plurality of unit cells 180 having a second pitch that is not the same as the first pitch. In particular, the pixel detectors 126 of the at least one radiation sensor 121 may have a pitch that is greater than the pitch of the unit cells 180 of the ASIC 130.

FIG. 6A illustrates the back side of a radiation sensor 121 including an array of pixel detectors 126 having a first pitch between adjacent pixel detectors 126, and FIG. 6B illustrates the front side of an ASIC 130 including an array of unit cells 180 having a second pitch between adjacent unit cells 180 according to an embodiment of the present disclosure. FIG. 6C is a vertical cross-section view of a portion of a radiation detector unit 210 including the radiation sensor 121 mounted over the front side of the ASIC 130 according to an embodiment of the present disclosure. The cross-section view of FIG. 6C is taken along line B-B' in FIG. 6B. Referring to FIGS. 6A-6C, the radiation sensor 121 and ASIC 130 of the radiation detector unit 210 may have similar constructions as the radiation sensor 121 and the ASIC 130 described above, and thus repeated discussion of like elements is omitted for brevity. In the embodiment of FIGS. 6A-6C, the pixel detectors 126 of the radiation sensor(s) 121 may form a periodic array (e.g., a rectangular array) in which each of the pixel detectors 126 has an identical size with a uniform center-to-center spacing (i.e., a first pitch) between adjacent pixel detectors 126. Similarly, the unit cells 180 of the ASIC 130 may form a periodic array (e.g., a rectangular array) in which each of the unit cells 180 has an identical size with a uniform center-to-center spacing (i.e., a second pitch) between adjacent unit cells 180. However, the pixel detectors 126 of the radiation sensor 121 may have a larger horizontal cross-sectional area than the horizontal cross-sectional area of the unit cells 180 of the ASIC 130. Accordingly, the center-to-center distance (i.e., the first pitch) between adjacent pixel detectors 126 of the radiation sensor(s) 121 may be larger than the center-to-center distance (i.e., the second pitch) between adjacent unit cells 180 of the ASIC 130. In the embodiment shown in FIGS. 6A-6C, the first pitch between the adjacent pixel detectors 126 is twice as large as the second pitch between the adjacent unit cells 180. Thus, in one non-limiting example, the second pitch of the unit cells 180 may be 330 μm, and the first pitch of the pixel detectors 126 may be 660 μm.

In an embodiment radiation detector unit 210 shown in FIGS. 6A-6C, the ASIC 130 and the radiation sensor(s) 121 mounted thereto may have identical or substantially identical horizontal dimensions. Thus, the total number of unit cells 180 of the ASIC 130 may be greater than the total number of pixel detectors 126 of the radiation sensor(s) 121 due to the smaller size of the unit cells 180 relative to the size of the pixel detectors 126. Accordingly, only a subset of the total number of unit cells 180 may be electrically coupled to a pixel detector 126 via a bonding material portion 82. The unit cells 180 of the ASIC 130 that are electrically coupled to a pixel detector 126 of a radiation sensor 121 may be referred to as "active unit cells" 180a. The remaining unit cells 180 of the ASIC 130 are not electrically coupled to a pixel detector 126 of a radiation sensor 121 and may be referred to as "inactive unit cells" 180i. In various embodiments, electrical power may be provided to circuit regions 181 including signal processing channel circuitry in each of the active unit cells 180a. However, the circuit regions in the inactive unit cells 180i may be powered down (i.e., electrical power is not provided to the circuit regions in the inactive unit cells 180i) to avoid unnecessary power dissipation. Thus, the circuit regions including the signal processing channel circuitry in the inactive unit cells 180i may be referred to as inactive circuit regions 186. In the embodiment shown in FIGS. 6A-6C, one out of every four unit cells 180 of the ASIC 130 may be active unit cells 180a, and the remainder of the unit cells 180 may be inactive unit cells 180i.

Thus, during the operation of the radiation detector unit 210, X-rays are provided from a radiation source 110 through an intervening space 108 containing an object 10 therein to the at least one radiation sensor 121, power is provided to the active unit cells 180a during the step of providing X-rays, to detect a signal from the at least one radiation sensor 121; and providing no power to the inactive unit cells 180i during the step of providing X-rays.

In the embodiment shown in FIGS. 6A-6C, each of the pixel detectors 126 is directly coupled to a contact region 182 of an active unit cell 180a by a bonding material portion 82 and the ASIC 130 does not include a redistribution layer 185 as described above with reference to FIGS. 5A-5C. However, it will be understood that in other embodiments, a redistribution layer 185 over the front surface of the ASIC 130 may be utilized to route signals from one or more pixel detectors 126 to the contact region 182 of the corresponding active unit cell 180a of the ASIC 130.

Figure 7A:
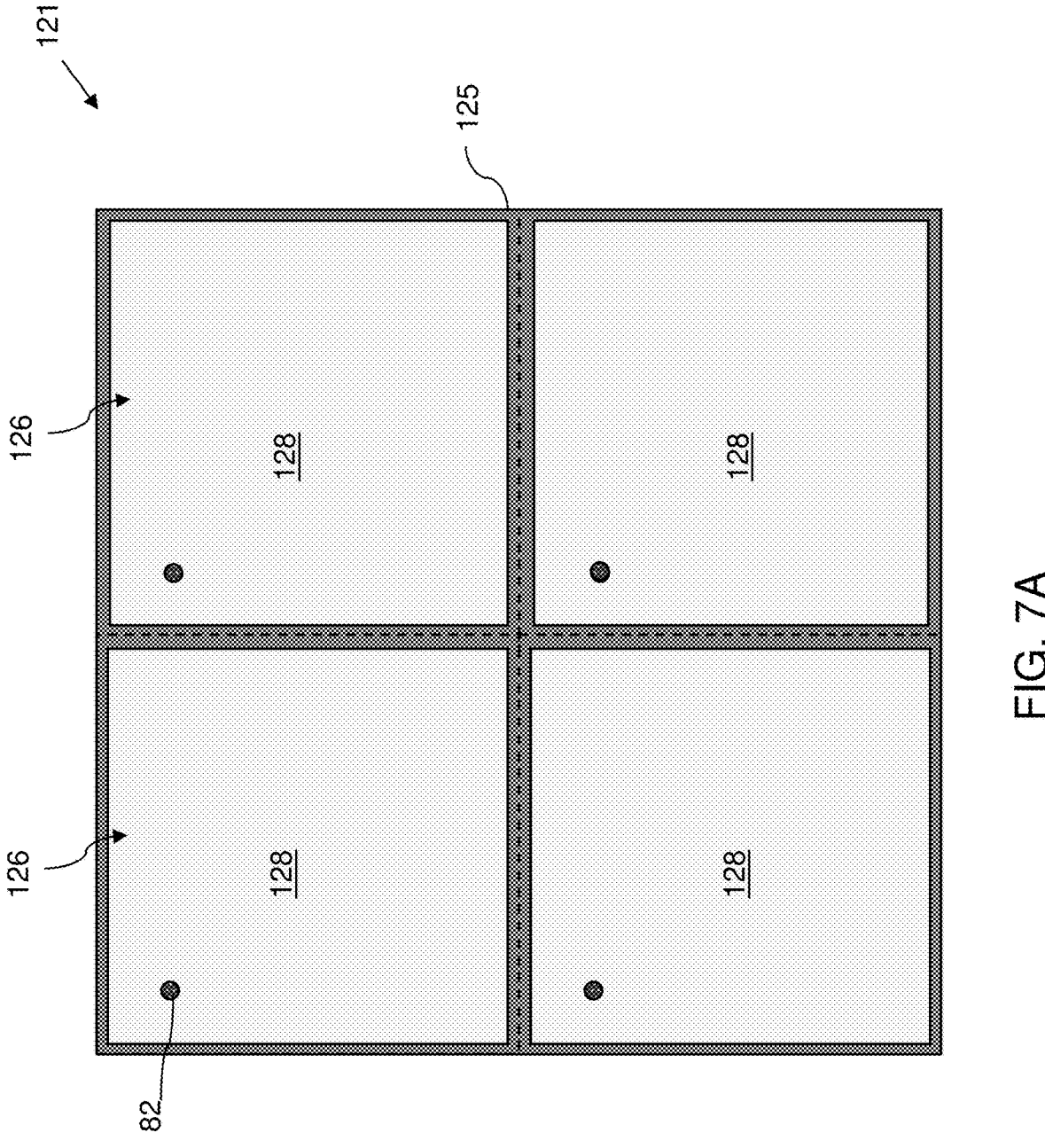
FIG. 7A illustrates the back side of a radiation sensor including an array of pixel detectors having a first pitch between adjacent pixel detectors according to an embodiment of the present disclosure.
Figure 7B:
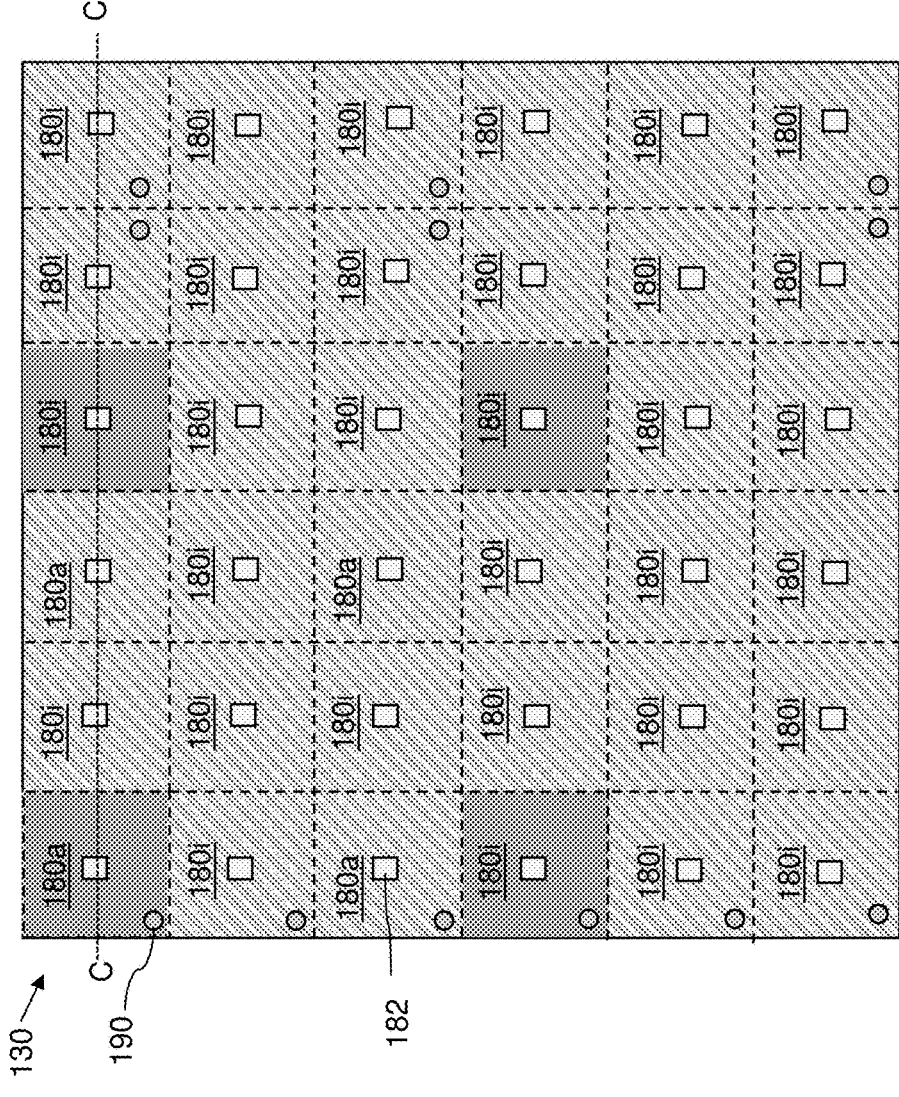
FIG. 7B illustrates the front side of an ASIC including an array of unit cells having a second pitch between adjacent unit cells according to an embodiment of the present disclosure.
Figure 7C:
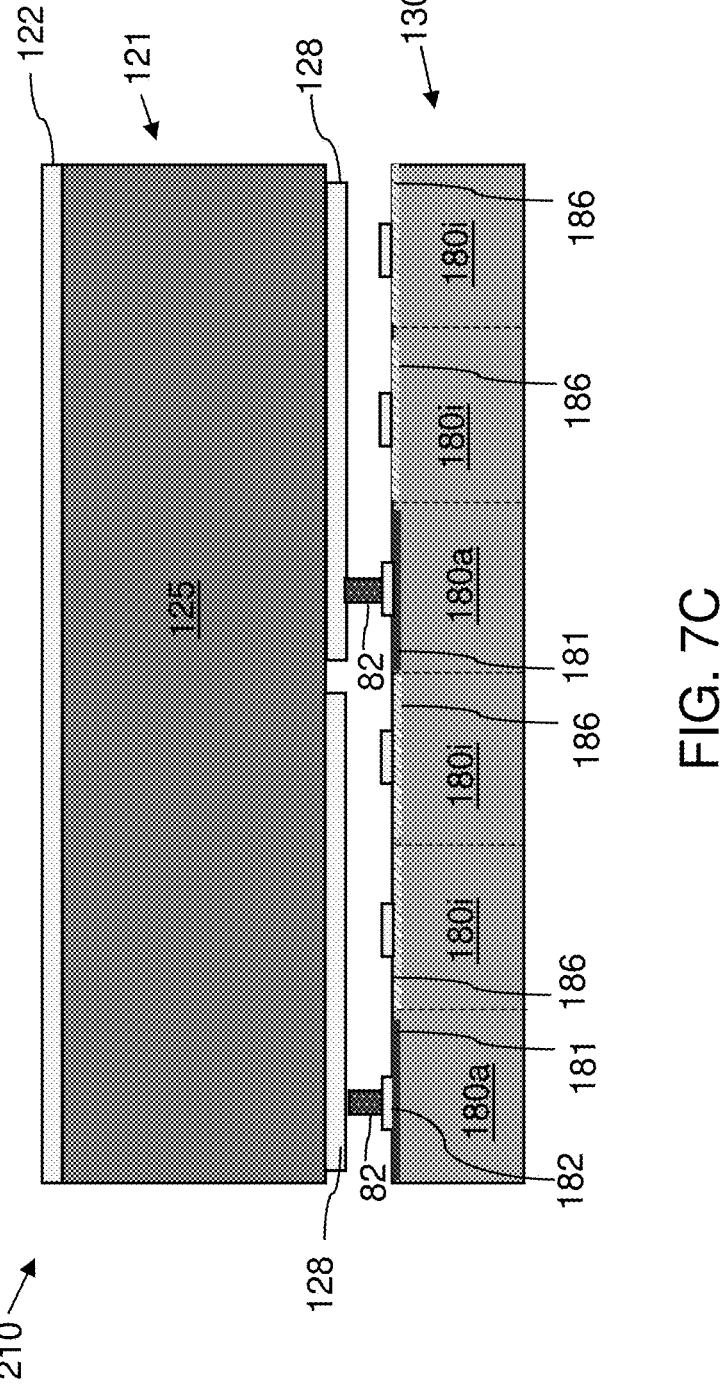
FIG. 7C is a vertical cross-section view of a portion of a radiation detector unit including the radiation sensor of FIG. 7A mounted over the front side of the ASIC of FIG. 7B according to an embodiment of the present disclosure.

FIGS. 7A-7C illustrate yet another embodiment of a radiation detector unit 210 in which the pitch of the pixel detectors 126 of the radiation sensor(s) 121 is greater than the pitch of the unit cells 180 of the ASIC 130. FIG. 7A illustrates the back side of a radiation sensor 121 including an array of pixel detectors 126 having a first pitch between adjacent pixel detectors 126, and FIG. 7B illustrates the front side of an ASIC 130 including an array of unit cells 180 having a second pitch between adjacent unit cells 180 according to an embodiment of the present disclosure. FIG. 7C is a vertical cross-section view of a portion of a radiation detector unit 210 including the radiation sensor 121 of FIG. 7A mounted over the front side of the ASIC 130 according to an embodiment of the present disclosure. The cross-section view of FIG. 7C is taken along line C-C' in FIG. 7B. Referring to FIGS. 7A-7C, the radiation sensor 121 and ASIC 130 of the radiation detector unit 210 may have similar constructions as the radiation sensor 121 and the ASIC 130 described above with reference to FIGS. 7A-7C, and thus repeated discussion of like elements is omitted for brevity. In the embodiment of FIGS. 7A-7C, the first pitch between the adjacent pixel detectors 126 of the radiation sensor 121 is three (3) times greater than the second pitch between the adjacent unit cells 180 of the ASIC 130. A subset of the unit cells 180 of the ASIC 130 may be electrically coupled to a pixel detector 126 by a bonding material portion 82 and thus may be active unit cells 180a. The remainder of the unit cells 180 may be inactive unit cells 180i and may be powered down. In the embodiment of FIGS. 7A-7C, one out of every nine (9) unit cells 180 of the ASIC 130 may be active unit cells 180a, and the remaining unit cells 180 may be inactive unit cells 180i. In embodiments in which the ratio, R, of the first pitch to the second pitch is an integer value (as in the cases of FIGS. 6A-6C and 7A-7C), the fraction of the total unit cells 180 of the ASIC 130 that are active unit cells 180a may be equal to $1/R^2$.

Figures 8A, 8B:
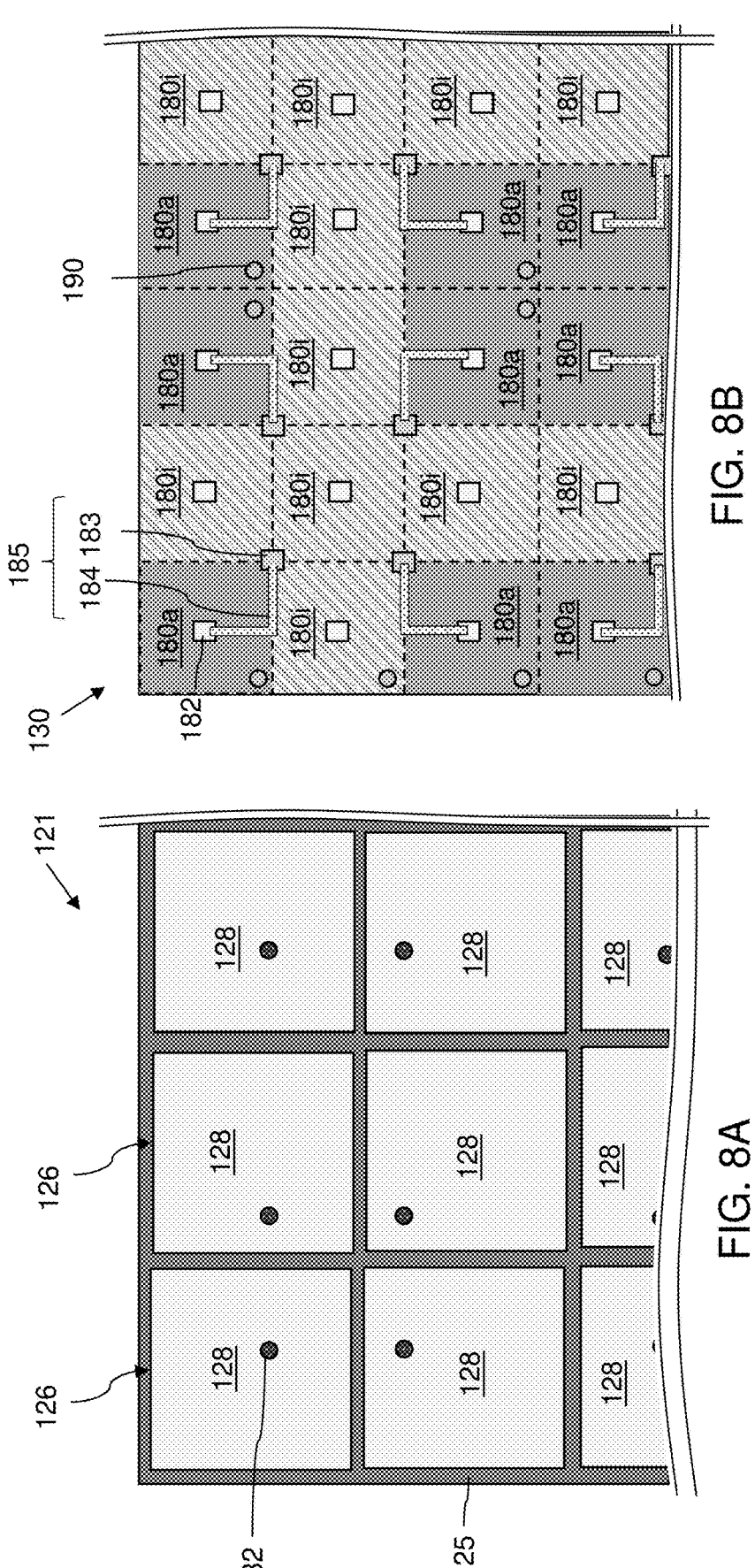
FIG. 8A illustrates the back side of a radiation sensor including an array of pixel detectors having a first pitch between adjacent pixel detectors according to an embodiment of the present disclosure.
FIG. 8B illustrates the front side of an ASIC including an array of unit cells having a second pitch between adjacent unit cells and a redistribution layer over the front side of the ASIC according to an embodiment of the present disclosure.

In still further embodiments, the ratio, R, between the first pitch and the second pitch may have a non-integer value. FIG. 8A illustrates the back side of a radiation sensor 121 including an array of pixel detectors 126 having a first pitch between adjacent pixel detectors 126, and FIG. 7B illustrates the front side of an ASIC 130 including an array of unit cells 180 having a second pitch between adjacent unit cells 180 according to an embodiment of the present disclosure. In one non-limiting embodiment, the first pitch between adjacent pixel detectors 126 may be 500 μm, and the second pitch between adjacent unit cells 180 may be 330 μm. Thus, the ratio, R, between the first pitch and the second pitch in this example is 1.51 (i.e., a non-integer value). As shown in FIG. 8B, the ASIC 130 may include an above-described redistribution layer 185 over the front surface of the ASIC 130. The redistribution layer 185 includes a plurality of bonding regions 183 may each be electrically connected to an anode electrode 128 of a pixel detector 126 via a bonding material portion 82. The redistribution layer 185 may additionally include conductive traces 184 that may extend between and electrically connect each pair of bonding region 183 and a contact region 182 of an active unit cell 180a of the ASIC 130. A subset of the unit cells 180 of the ASIC 130 may be electrically coupled to a pixel detector 126 via a bonding material portion 82, a bonding region 183, a conductive trace 184 and a contact region 182 and thus may be active unit cells 180a. The remainder of the unit cells 180 may be inactive unit cells 180i and may be powered down. In the embodiment of FIGS. 8A-8B, four (4) out of every nine (9) unit cells 180 of the ASIC 130 may be active unit cells 180a, and the remaining unit cells 180 may be inactive unit cells 180i.

The devices of the embodiments of the present disclosure can be employed in various radiation detection systems including computed tomography (CT) imaging systems. Any direct conversion radiation sensors may be employed such as radiation sensors employing Si, Ge, GaAs, CdTe, CdZnTe, and/or other similar semiconductor materials.

The radiation detectors of the present embodiments may be used for medical imaging, such as in Low-Flux applications in Nuclear Medicine (NM), whether by Single Photon Emission Computed Tomography (SPECT) or by Positron Emission Tomography (PET), or as radiation detectors in High-Flux applications as in X-ray Computed Tomography

19

(CT) for medical applications, and for non-medical imaging applications, such as in baggage security scanning and industrial inspection applications.

While the disclosure has been described in terms of specific embodiments, it is evident in view of the foregoing description that numerous alternatives, modifications and variations will be apparent to those skilled in the art. Each of the embodiments described herein can be implemented individually or in combination with any other embodiment unless expressly stated otherwise or clearly incompatible. Accordingly, the disclosure is intended to encompass all such alternatives, modifications and variations which fall within the scope and spirit of the disclosure and the following claims.

The invention claimed is:

1. A detector structure, comprising:

at least one radiation sensor comprising an array of pixel detectors;

an application specific integrated circuit (ASIC), comprising:

an array of unit cells, each unit cell comprising signal processing channel circuitry and a contact region on a front surface of the ASIC, wherein the contact region comprises an input node to the signal processing circuitry of the unit cell; and a redistribution layer located on the front surface of the ASIC, the redistribution layer comprising at least one bonding region laterally displaced from, and electrically connected to, a contact region of a unit cell; and a plurality of bonding material portions, each of the bonding material portions extending between a respective pixel detector of the array of pixel detectors and the front surface of the ASIC, wherein at least a portion of the bonding material portions contact a bonding region of the redistribution layer;

wherein:

the array of unit cells has an identical pitch between adjacent unit cells in the array unit cells, the pixel detectors of the radiation sensor have an identical pitch between adjacent pixel detectors, wherein the pitch between adjacent pixel detectors is greater than the pitch between adjacent unit cells, and a ratio between the pitch between adjacent pixel detectors and the pitch between adjacent unit cells is an integer value.

2. An X-ray imaging system, comprising:

a radiation source configured to emit X-rays; and a detector array including a plurality of detector structures of claim 1 that form a continuous detector surface and that are configured to receive the X-rays from the radiation source through an intervening space configured to contain an object therein.

3. The X-ray imaging system of claim 2, wherein the X-ray imaging system comprises a photon-counting computerized tomography (PCCT) imaging system comprising an image reconstruction system including a computer configured to run an automated image reconstruction algorithm on event detection signals generated by the detector modules of the detector array.

4. A detector structure, comprising:

at least one radiation sensor comprising an array of pixel detectors;

an application specific integrated circuit (ASIC), comprising:

an array of unit cells, each unit cell comprising signal processing channel circuitry and a contact region on a front surface of the ASIC, wherein the contact region comprises an input node to the signal processing circuitry of the unit cell; and a redistribution layer located on the front surface of the ASIC, the redistribution layer comprising at least one bonding region laterally displaced from, and electrically connected to, a contact region of a unit cell; and a plurality of bonding material portions, each of the bonding material portions extending between a respective pixel detector of the array of pixel detectors and the front surface of the ASIC, wherein at least a portion of the bonding material portions contact a bonding region of the redistribution layer;

wherein:

the array of unit cells has an identical pitch between adjacent unit cells in the array unit cells, the pixel detectors of the radiation sensor have an identical pitch between adjacent pixel detectors, wherein the pitch between adjacent pixel detectors is greater than the pitch between adjacent unit cells, and a ratio between the pitch between adjacent pixel detectors and the pitch between adjacent unit cells is a non-integer value.

5. A detector structure, comprising:

at least one radiation sensor comprising an array of pixel detectors having a first pitch between adjacent pixel detectors; and an application specific integrated circuit (ASIC) comprising an array of unit cells having a second pitch between adjacent pixel detectors, each unit cell comprising signal processing channel circuitry and a contact region on a front surface of the ASIC that comprises an input node to the signal processing circuitry of the unit cell, wherein:

the first pitch is greater than the second pitch, the at least one radiation sensor is mounted over the front surface of the ASIC such that each pixel detector is electrically coupled to a contact region of a respective unit cell of the ASIC, a first plurality of the unit cells of the ASIC comprise active unit cells that include a contact region that is electrically coupled to a pixel detector of the at least one radiation sensor, and a second plurality of the unit cells of the ASIC comprise inactive unit cells that are not electrically coupled to a pixel detector of the at least one unit sensor.

6. The detector structure of claim 5, wherein the inactive unit cells of the ASIC do not receive electrical power during operation of the detector structure.

7. The detector structure of claim 5, further comprising a plurality of bonding material portions, each of the bonding material portions extending between a respective pixel detector of the at least one radiation sensor and the front surface of the ASIC.

8. The detector structure of claim 7, wherein:

each of the bonding material portions contacts a contact region of an active unit cell of the ASIC;

the ASIC comprises at least one through-substrate via extending through the ASIC; and the at least one radiation sensor is bonded directly to the ASIC via the plurality of bonding material portions without an interposer located between the at least one radiation sensor and the ASIC.

9. The detector structure of claim 7, wherein at least a portion of the bonding material portions contact a bonding region of a redistribution layer located on the front surface of ASIC, wherein each of the bonding regions is laterally displaced from, and electrically coupled to, a contact region of an active unit cell of the ASIC.

10. The detector structure of claim 5, wherein the signal processing channel circuitry in each of the unit cells comprises an amplifier coupled to the contact region of the unit cell, a shaper circuit block coupled to the amplifier, a discrimination circuit block coupled to the shaper circuit block, and a counter circuit block coupled to the shaper circuit block.

11. The detector structure of claim 10, wherein the amplifier comprises a charge sensitive amplifier (CSA), the signal processing circuitry further comprises a baseline restoration (BLR) circuit block, and the discrimination circuit block comprises a plurality of comparator circuits coupled to a respective counter circuit block and configured to sort photon interaction events into different energy bins.

12. A method of opening the detector structure of claim 5, comprising:

providing X-rays from a radiation source through an intervening space containing an object therein to the at least one radiation sensor;

providing power to the active unit cells during the step of providing X-rays to detect a signal from the at least one radiation sensor; and providing no power to the inactive unit cells during the step of providing X-rays.

\* \* \* \* \*